US010683798B2

United States Patent
Noda et al.

(10) Patent No.: US 10,683,798 B2
(45) Date of Patent: Jun. 16, 2020

(54) TURBOCHARGER, ENGINE SYSTEM, AND CONTROL METHOD FOR TURBOCHARGER

(71) Applicant: MITSUBISHI HEAVY INDUSTRIES ENGINE & TURBOCHARGER, LTD., Sagamihara-shi, Kanagawa (JP)

(72) Inventors: Yoshitomo Noda, Tokyo (JP); Motoki Ebisu, Tokyo (JP); Hiroshi Suzuki, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 132 days.

(21) Appl. No.: 15/780,482

(22) PCT Filed: Dec. 4, 2015

(86) PCT No.: PCT/JP2015/084160
§ 371 (c)(1),
(2) Date: May 31, 2018

(87) PCT Pub. No.: WO2017/094187
PCT Pub. Date: Jun. 8, 2017

(65) Prior Publication Data
US 2018/0347455 A1  Dec. 6, 2018

(51) Int. Cl.
*F02B 39/14* (2006.01)
*F01M 1/16* (2006.01)
(Continued)

(52) U.S. Cl.
CPC .............. *F02B 39/14* (2013.01); *F01D 25/16* (2013.01); *F01D 25/18* (2013.01); *F01D 25/20* (2013.01);
(Continued)

(58) Field of Classification Search
CPC .......... F01D 25/16; F01D 25/18; F01D 25/20; F01M 1/16; F02B 39/14; F02C 5/00;
(Continued)

(56) References Cited

U.S. PATENT DOCUMENTS 5,253,985 A    10/1993  Ruetz
2011/0274379 A1  11/2011 Fiedler et al.
(Continued)

FOREIGN PATENT DOCUMENTS

CN    201003423 Y    1/2008
CN    103477099 A    12/2013
(Continued)

OTHER PUBLICATIONS

International Search Report and Written Opinion of the International Searching Authority (Forms PCT/ISA/210 and PCT/ISA/237) for Application No. PCT/JP2015/084160, dated Feb. 2, 2016, with an English translation.

*Primary Examiner* — Brandon D Lee
(74) *Attorney, Agent, or Firm* — Birch, Stewart, Kolasch & Birch, LLP

(57) ABSTRACT

The present invention provides a turbocharger including: a rotating shaft; a turbine wheel; a compressor wheel; a rolling bearing including an inner race fixed to an outer circumferential surface of the rotating shaft, an outer race surrounding the inner race from the outside in a radial direction, and rolling bodies arranged between the inner and outer races and that supports the rotating shaft to be rotatable about an axis; a housing that covers the rolling bearing from an outer circumferential side via a gap between the housing and an outer circumferential surface of the rolling bearing; and a lubricant supply line configured to supply a lubricant into the housing. The turbocharger includes an operating state detection unit that detects an operating state of the turbocharger and a lubricant regulating unit configured to regulate (Continued)

the flow rate of the lubricant flowing through the lubricant supply line depending on the operating state.

5 Claims, 15 Drawing Sheets

(51) Int. Cl.
| | |
|---|---|
| *F16C 19/06* | (2006.01) |
| *F16C 33/66* | (2006.01) |
| *F16N 7/32* | (2006.01) |
| *F01D 25/18* | (2006.01) |
| *F16C 27/04* | (2006.01) |
| *F01D 25/16* | (2006.01) |
| *F01D 25/20* | (2006.01) |
| *F02C 5/00* | (2006.01) |
| *F02C 7/06* | (2006.01) |

(52) U.S. Cl.
CPC ............... *F01M 1/16* (2013.01); *F02C 5/00* (2013.01); *F02C 7/06* (2013.01); *F16C 19/06* (2013.01); *F16C 27/045* (2013.01); *F16C 33/66* (2013.01); *F16C 33/6659* (2013.01); *F16C 33/6674* (2013.01); *F16C 33/6681* (2013.01); *F16N 7/32* (2013.01); *F05D 2220/40* (2013.01); *F05D 2260/98* (2013.01); *F05D 2270/07* (2013.01); *F16C 2233/00* (2013.01); *F16C 2360/24* (2013.01)

(58) Field of Classification Search
CPC .......... F02C 7/06; F16C 19/06; F16C 27/045; F16C 33/66; F16C 33/6659; F16C 33/6674; F16C 33/6681; F16C 2233/00; F16C 2360/24; F16N 7/32; F05D 2220/40; F05D 2260/98; F05D 2270/07
See application file for complete search history.

(56) References Cited

U.S. PATENT DOCUMENTS

| | | | |
|---|---|---|---|
| 2012/0177476 A1* | 7/2012 | Jones | ...................... F02B 39/14 415/1 |
| 2014/0086731 A1 | 3/2014 | Schmidt et al. | |
| 2016/0010613 A1* | 1/2016 | O'Brien | ..................... F01P 3/00 123/179.3 |

FOREIGN PATENT DOCUMENTS

| | | |
|---|---|---|
| DE | 199 59 485 A1 | 6/2001 |
| JP | 58-15721 A | 1/1983 |
| JP | 1-113136 U | 7/1989 |
| JP | 4-350327 A | 12/1992 |
| JP | 2002-332864 A | 11/2002 |
| JP | 2008-255828 A | 10/2008 |
| JP | 2009-243365 A | 10/2009 |
| JP | 2013217436 A | 10/2013 |
| WO | WO 2015/114378 A1 | 8/2015 |

* cited by examiner

TURBOCHARGER, ENGINE SYSTEM, AND CONTROL METHOD FOR TURBOCHARGER

TECHNICAL FIELD

The present invention relates to a turbocharger, an engine system, and a control method for the turbocharger.

BACKGROUND ART

Some turbochargers are configured to support a rotating shaft by means of a rolling bearing. Such a turbocharger includes a housing with a tubular housing part for housing the rolling bearing. The rolling bearing is supported by the housing by fitting an outer race of the rolling bearing into the housing part of the housing. The rotating shaft of the turbocharger is fitted in a rotatable inner race of the rolling bearing. Thereby, the rotating shaft is made rotatable relative to the housing.

In this turbocharger, a lubricant is supplied to the rolling bearing in order to reduce frictional resistance in the rolling bearing. If a supply quantity of the lubricant is too small, a temperature of the rolling bearing rises during an operation of the turbocharger. In contrast, if the lubricant is oversupplied, the stirring loss of the lubricant increases in the rolling bearing.

In Patent Document 1, a constitution having a lubricating hole for supplying a lubricant to a rolling bearing of a turbocharger is disclosed. Patent Document 1 includes a distributing flange portion that distributes the lubricant to the rolling bearing side and a turbine wheel side. With this constitution, oversupply of the lubricant to the rolling bearing is reduced, and the stiffing resistance of the lubricant in the rolling bearing is reduced.

CITATION LIST

Patent Document

Patent Document: Japanese Unexamined Patent Application, First Publication No. 2013-217436

SUMMARY OF INVENTION

Technical Problem

In the aforementioned turbocharger, a necessary amount of the lubricant is changed depending on an operating state. The turbine wheel is rotated by an exhaust gas fed from an engine, and thereby the turbocharger rotates the rotating shaft. For this reason, if the engine is operated with high rotation, the flow rate of the exhaust gas fed from the engine increases. Then, the turbocharger is rotated with high rotation, and the quantity of heat received from the exhaust gas also increases, so that the temperature of the turbocharger rises. In this way, when the temperature of the turbocharger rises, since the viscosity of the lubricant is reduced and then it makes lubricity deteriorate, more lubricant is required.

Meanwhile, in a state in which the turbocharger is in normal operation, it is desirable that the supply quantity of the lubricant supplied to the rolling bearing be reduced as much as possible, and that loss caused by supplying the lubricant be reduced.

The invention is directed to providing a turbocharger, an engine system, and a control method for the turbocharger, capable of performing proper supply of a lubricant depending on an operating state and reduces the flow rate of the lubricant to reduce loss.

Solution to Problem

According to a first aspect of the invention, a turbocharger includes: a rotating shaft configured to extend along an axis; a turbine wheel installed on a first end of the rotating shaft; and a compressor wheel installed on a second end of the rotating shaft. The turbocharger further includes: a rolling bearing having an inner race fixed to an outer circumferential surface of the rotating shaft, an outer race disposed to surround the inner race from an outside in a radial direction thereof, and rolling elements arranged between the inner race and the outer race, and configured to support the rotating shaft to be rotatable about the axis. The turbocharger further includes: a housing disposed to cover the rolling bearing from an outer circumferential side via a gap between the housing and an outer circumferential surface of the rolling bearing; and a lubricant supply line configured to supply a lubricant into the housing. The turbocharger further includes: an operating state detection unit configured to detect an operating state; and a lubricant regulating unit configured to regulate the flow rate of the lubricant flowing through the lubricant supply line depending on the operating state.

According to this constitution, the flow rate of the supplied lubricant can be changed depending on the operating state of the turbocharger, for instance, a temperature and the number of revolutions of an engine having the turbocharger. As a result, proper supply of the lubricant can be performed depending on the operating state, and the flow rate of the lubricant can be reduced to reduce loss.

According to a second aspect of the invention, the turbocharger may further include, in the turbocharger of the first aspect, a control unit configured to control the lubricant regulating unit on the basis of the operating state detected by the operating state detection unit.

In this way, the control unit controls the lubricant regulating unit on the basis of the operating state detected by the operating state detection unit, and thereby the lubricant regulating unit can be more finely regulated.

According to a third aspect of the invention, in the turbocharger of the second aspect, the operating state detection unit may be configured to detect the temperature of the housing as the operating state.

According to this constitution, the flow rate of the supplied lubricant can be changed depending on the temperature of the housing. As a result, the proper supply of the lubricant can be performed depending on the operating state, and the flow rate of the lubricant can be reduced to reduce loss.

According to a fourth aspect of the invention, in the turbocharger of the third aspect, the control unit may be configured to increase the flow rate of the lubricant as the temperature of the housing rises.

According to this constitution, when the number of revolutions of the turbocharger rises, the temperature of the housing rises as well. Accordingly, when the temperature of the housing of the turbocharger rises, more lubricant is required in each unit of the turbocharger. Depending on the rise of the temperature of the housing, more lubricant is supplied, and thereby each unit of the turbocharger can be appropriately lubricated.

According to a fifth aspect of the invention, in the turbocharger of any one of the second to fourth aspects, the lubricant regulating unit may include a pump configured to supply the lubricant to the lubricant supply line, and a control valve that is provided on the lubricant supply line, and the control unit may be configured to reduce the flow rate using both of the control valve and the pump when the flow rate of the lubricant is reduced.

According to this constitution, when the flow rate of the lubricant is reduced, the flow rate is reduced by both of the control valve and the pump. Thereby, the flow rate of the lubricant can be rapidly reduced, and loss caused by the lubricant can be effectively reduced.

According to a sixth aspect of the invention, an engine system includes: the turbocharger of any one of the second to fifth aspects; and an engine supercharged by the turbocharger. The operating state detection unit detects an operating state of the engine, and the control unit is configured to regulate the flow rate of the lubricant depending on the operating state of the engine.

According to this constitution, since the operating state of the turbocharger is changed by interlocking with the operating state of the engine, the flow rate of the lubricant supplied to the turbocharger is changed depending on the operating state of the engine, and thereby proper supply of the lubricant can be performed depending on the operating state.

According to a seventh aspect of the invention, in the engine system of the sixth aspect, the operating state detection unit may be configured to detect the number of revolutions of the engine.

According to this constitution, when the number of revolutions of the turbocharger rises, the temperature of the housing also rises. When the temperature of the housing of the turbocharger rises, more lubricant is required in each unit of the turbocharger. Accordingly, the number of revolutions of the engine is detected to regulate the flow rate of the lubricant, and thereby each unit of the turbocharger can be appropriately lubricated.

According to an eighth aspect of the invention, a control method for a turbocharger includes: a process of detecting an operating state; and a process of regulating the flow rate of a lubricant supplied into a housing for housing a rolling bearing depending on the operating state.

According to this constitution, the flow rate of the supplied lubricant can be regulated depending on the operating state of the turbocharger, for instance, a temperature and the number of revolutions of an engine having the turbocharger. As a result, proper supply of the lubricant can be performed depending on the operating state, and the flow rate of the lubricant can be reduced to reduce loss.

According to a ninth aspect of the invention, the control method for a turbocharger may further include, in the eighth aspect, a process of reducing the flow rate of the lubricant, which is supplied into the housing by a lubricant supply line, using both of a pump configured to supply the lubricant to the lubricant supply line and a control valve that is provided on the lubricant supply line.

According to this constitution, when the flow rate of the lubricant is reduced, the flow rate is reduced by both of the control valve and the pump. Thereby, the flow rate of the lubricant can be rapidly reduced, and loss caused by the lubricant can be effectively reduced.

Advantageous Effects of Invention

According to the turbocharger, the engine system, and the control method for the turbocharger, it is possible to perform proper supply of a lubricant depending on an operating state and to reduce the flow rate of the lubricant to reduce loss.

DESCRIPTION OF EMBODIMENTS

First Embodiment

Figure 1:
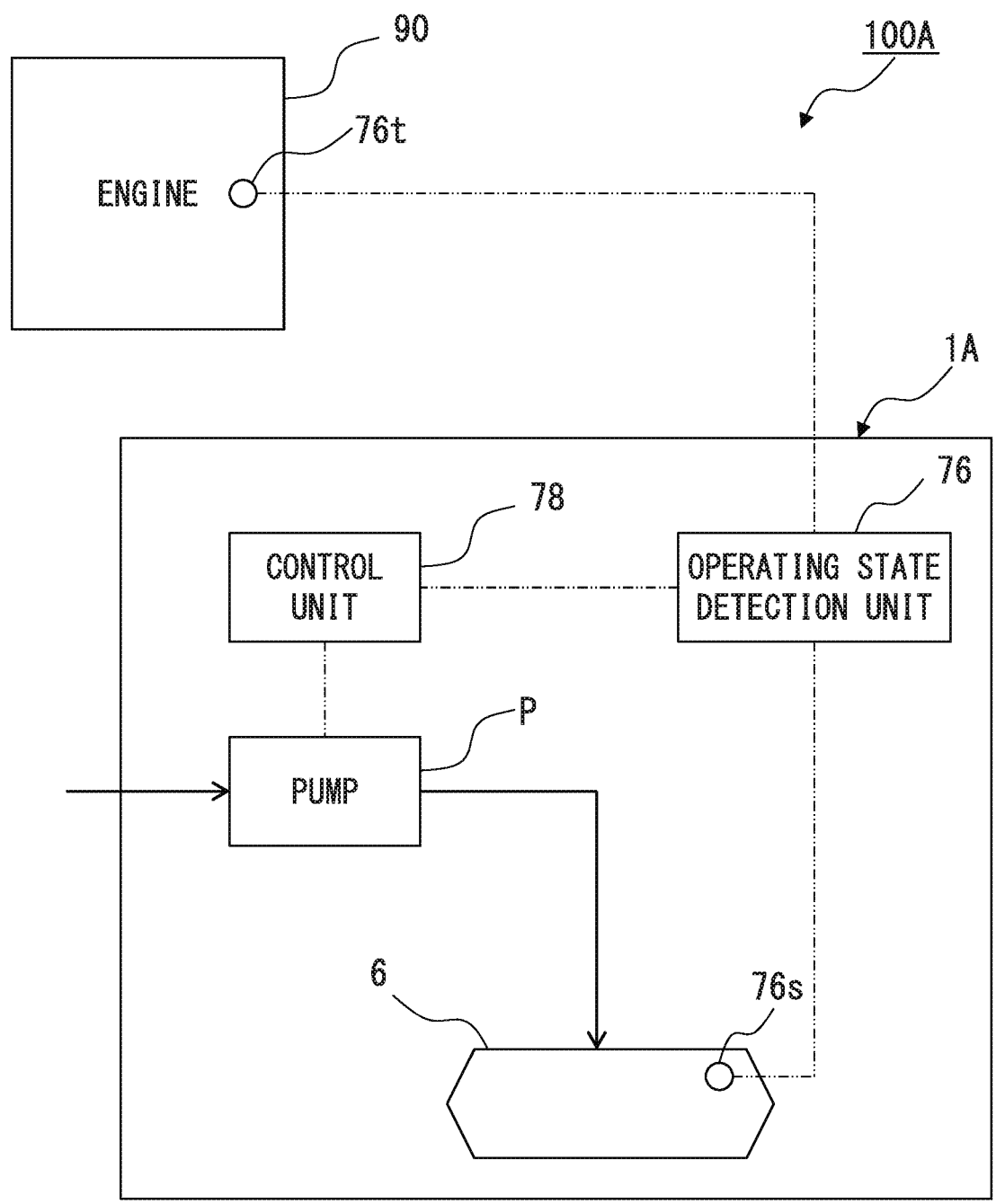
FIG. 1 is a diagram showing a schematic constitution of an engine system in a first embodiment of the invention.
Figure 2:
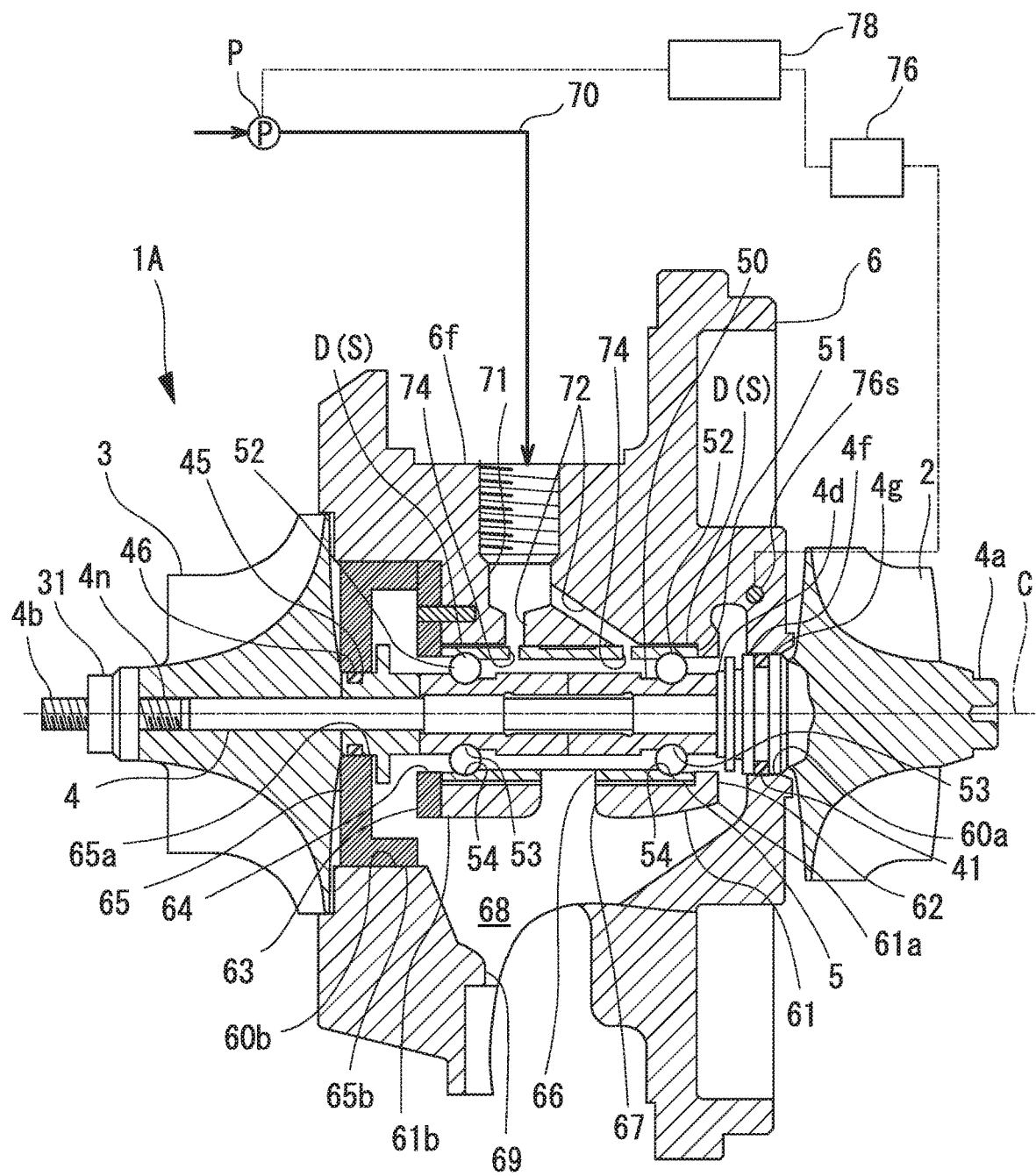
FIG. 2 is a sectional view showing a constitution of a turbocharger in a first embodiment of the invention.

FIG. 1 is a diagram showing a schematic constitution of an engine system in a first embodiment of the invention. FIG. 2 is a sectional view showing a constitution of a turbocharger in a first embodiment of the invention.

As shown in FIG. 1, an engine system 100A includes a turbocharger 1A, and an engine 90 supercharged by the turbocharger 1A.

As shown in FIG. 2, the turbocharger 1A includes a turbine wheel 2, a compressor wheel 3, a rotating shaft 4, a rolling bearing 5, and a housing 6. The turbocharger 1A is mounted, for instance, in a vehicle or the like as an auxiliary machine of the engine 90 in a posture in which the rotating shaft 4 extends in a horizontal direction.

An alternate long and short dash line shown in FIG. 2 indicates a central axis (an axis) C of the rotating shaft 4.

In the following description, in the state in which the turbocharger 1A is mounted in the vehicle or the like, a side oriented upward is referred to as an "upper side," and a side oriented downward is referred to as a "lower side."

In the turbocharger 1A, the turbine wheel 2 is rotated about a central axis C by an exhaust gas flow supplied from the engine 90 (see FIG. 1). The rotating shaft 4 and the compressor wheel 3 are rotated about the central axis C with the rotation of the turbine wheel 2. The compressor wheel 3 is rotated to compress air. The compressed air is supplied to the engine 90 (see FIG. 1).

The housing 6 is supported by a vehicle body via a bracket (not shown), a compressor, a turbine, and so on. The housing 6 has a housing part 61 in which the rolling bearing 5 is housed. The housing 6 has an opening 60a on one end side thereof and an opening 60b on the other end side thereof. The rotating shaft 4 is supported to be rotatable about the central axis C by the rolling bearing 5 housed in the housing part 61. First and second ends 4a and 4b of the rotating shaft 4 protrude outside the housing 6 through the openings 60 and 60b.

The turbine wheel 2 is installed on one end side of the housing 6, and the compressor wheel 3 is installed on the other end side of the housing 6. The turbine wheel 2 is integrally provided at the first end 4a of the rotating shaft 4. The compressor wheel 3 is coupled to a threaded portion 4n formed on the second end 4b of the rotating shaft 4 by screwing a nut 31. The rotating shaft 4, the turbine wheel 2, and the compressor wheel 3 are rotated about the central axis C in a body with the rotating shaft 4.

The rolling bearing 5 includes an inner race 50, an outer race 51, and rolling elements 52.

The inner race 50 is formed in a cylindrical shape. As an outer circumferential surface of the rotating shaft 4 is, for instance, fitted inside the inner race 50, the inner race 50 is fixed, and is rotated integrally with the rotating shaft 4.

The outer race 51 is formed in a cylindrical shape having a larger diameter than the inner race 50. The outer race 51 is disposed on an outer circumferential side of the inner race 50, and is disposed to surround the inner race 50 from the outside in a radial direction. Further, the outer race 51 is disposed at a distance from the inner race 50 in the radial direction.

The rolling elements 52 are formed in a spherical shape. The plurality of rolling elements 52 are provided between the inner race 50 and the outer race 51. The plurality of rolling elements 52 are provided by a retainer (not shown) at intervals in a circumferential direction. Raceway grooves 53 continuing in the circumferential direction are formed in opposite ends of an outer circumferential surface of the inner race 50 in an axial direction in which the central axis C extends. Likewise, raceway grooves 54 continuing in the circumferential direction are formed in opposite ends of an inner circumferential surface of the outer race 51 in a direction of the central axis C to face the raceway grooves 53 on outer circumferential sides of the raceway grooves 53. The plurality of rolling elements 52 are sandwiched between the raceway grooves 53 and 54 at each of the opposite ends of the rolling bearing 5 in the axial direction in which the central axis C extends. Thereby, when the inner race 50 is rotated relative to the outer race 51 along with the rotating shaft 4, the plurality of rolling elements 52 roll between the inner race 50 and the outer race 51.

The housing part 61 formed inside the housing 6 is formed in a circular sectional shape when viewed in the axial direction in which the central axis C extends. The housing part 61 is formed to be continuous in the axial direction in which the central axis C extends. The rolling bearing 5 is housed in the housing part 61.

To be more specific, the outer race 51 of the rolling bearing 5 is disposed inside the housing part 61. An inner diameter of the housing part 61 is formed to be slightly larger than an outer diameter of the outer race 51 of the rolling bearing 5. Thereby, a gap S is formed between the outer race 51 of the rolling bearing 5 and the housing part 61.

A thrust receiving portion 62 is formed at an end 61a of the housing part 61 which is close to the turbine wheel 2. The thrust receiving portion 62 receives a thrust load of the rolling bearing 5 which is directed to the turbine wheel 2. The thrust receiving portion 62 protrudes inward from the end 61a of the housing part 61 in a radial direction. The outer race 51 of the rolling bearing 5 housed in the housing part 61 bumps against the thrust receiving portion 62.

A thrust receiving member 63 is mounted on an end 61b of the housing part 61 which is close to the compressor wheel 3. The thrust receiving member 63 receives a thrust load of the rolling bearing 5 which is directed to the compressor wheel 3. The thrust receiving member 63 is formed in a disc shape having an opening 64 in the middle thereof. The thrust receiving member 63 is provided in a state in which it bumps against the end 61b of the housing part 61. The outer race 51 bumps against a circumferential edge of the opening 64 of the thrust receiving member 63. Here, the thrust receiving portion 62 and the thrust receiving member 63 may be provided as needed, and may be omitted.

The rotating shaft 4 has a large diameter portion 4d provided closer to the turbine wheel 2 than the inner race 50 of the rolling bearing 5. The large diameter portion 4d has an outer diameter larger than an inner diameter of the inner race 50. The inner race 50 is provided in a state in which an end thereof which is close to the turbine wheel 2 bumps against the large diameter portion 4d of the rotating shaft 4.

Flange portions 4f and 4g projected from the large diameter portion 4d to an outer circumferential side are formed on the rotating shaft 4 inside the opening 60a of the housing 6. The flange portions 4f and 4g are formed at an interval in the axial direction of the rotating shaft 4.

An annular oil ring 41 continuous in a circumferential direction is provided between the flange portions 4f and 4g of the rotating shaft 4. Sealability is maintained between the opening 60a and the rotating shaft 4 by the oil ring 41.

A cylindrical bush 45 is provided on the rotating shaft 4 at a side close to the compressor wheel 3 with respect to the inner race 50 of the rolling bearing 5. The bush 45 is provided between the inner race 50 and the compressor wheel 3 in a sandwiched state.

In this way, the inner race 50 of the rolling bearing 5 is provided between the large diameter portion 4d of the rotating shaft 4 and the bush 45 in a sandwiched state.

A plate 65 for blocking the opening 60b is provided in the opening 6b of the housing 6. The plate 65 is formed in a disc shape having an opening 65a in the middle thereof. A circumferential wall portion 65b, which extends to the thrust receiving member 63 side of the axial direction in which the central axis C extends, is integrally formed at an outer circumferential portion of the plate 65. The plate 65 is provided in a state in which the bush 45 is inserted into the opening 65a and the circumferential wall portion 65b bumps against the thrust receiving member 63.

An annular oil ring 46 is provided on an outer circumferential surface of the bush 45 inside the opening 65a. Sealability is maintained between the opening 65a and the rotating shaft 4 by the oil ring 46.

Further, the housing 6 has a feed pipe connecting port 71 that extends inward from an outer circumferential surface 6f in a radial direction of the housing 6. A lubricant supply pipe (a lubricant supply line) 70 for supplying a lubricant from the outside of the housing 6 is connected to the feed pipe connecting port 71. The lubricant supply pipe 70 has a pump (a lubricant regulating unit) P for supplying the lubricant toward the housing 6. The number of revolutions of the pump P is made variable by a controller (a control unit) 78, and thereby a discharge quantity of the lubricant discharged from the pump P is made variable.

A plurality of supply channels 72 are formed between a tip portion of the feed pipe connecting port 71 and the housing part 61. The supply channels 72 are open just inside the rolling elements 52 provided on the opposite ends of the rolling bearing 5 in the axial direction in which the central axis C extends.

The outer race 51 of the rolling bearing 5 housed in the housing part 61 has lubricant introduction holes 74. These lubricant introduction holes 74 are formed at positions that face the supply channels 72 that are open to an inner surface of the housing part 61, and are formed to pass through the outer race 51 in a radial direction.

When the lubricant is fed from the lubricant supply pipe 70 connected to the feed pipe connecting port 71, the lubricant is fed into the housing part 61 from the tip portion of the feed pipe connecting port 71 through the two supply channels 72. Further, the lubricant is fed inside the outer race 51 through the lubricant introduction holes 74. Thereby, the lubricant is supplied between the inner race 50 and the outer race 51 of the rolling bearing 5, and the rolling elements 52 are lubricated.

Some of the lubricant fed through the supply channels 72 is fed to the gap S between the housing part 61 and the outer race 51. Thereby, an oil film damper D, which suppresses noises and vibrations during the rotation of the rotating shaft 4, is formed in the gap S between the housing part 61 and the outer race 51. When the vibrations occur at the rotating shaft 4, the oil film damper D exerts a vibration damping effect caused by a squeeze film damper phenomenon of an oil film.

Discharge channels 66 and 67 penetrating downward are formed at lowermost ends of the outer race 51 of the rolling bearing 5 and the housing part 61.

An oil discharge chamber 68 is formed in the housing 6 under the housing part 61. The discharge channels 66 and 67 are open to an upper portion of the oil discharge chamber 68.

The housing 6 includes an oil outlet 69 that passes through a lower end of the oil discharge chamber 68 and an outer circumferential surface 6f at a lowermost portion of the housing 6.

The lubricant fed between the outer race 51 and the inner race 50 of the rolling bearing 5 is discharged to the oil discharge chamber 68 through both ends of the outer race 51 and the inner race 50 in the axial direction in which the central axis C extends, the discharge channel 66 formed in the outer race 51, and the discharge channel 67 formed in the housing part 61.

The lubricant fed to the gap S between the housing part 61 and the outer race 51 flows out from a circumferential edge of the discharge channel 66 to the discharge channel 67, and is discharged to the oil discharge chamber 68.

The lubricant supplied to the oil ring 41 flows downward with no change, and is discharged to the oil discharge chamber 68.

The lubricant in the oil discharge chamber 68 is discharged to the outside of the housing 6 through the oil outlet 69.

The controller 78 is configured to regulate a discharge quantity of the lubricant caused by the pump P depending on, for instance, the temperature of the housing 6 which is measured by an operating state detection unit 76.

The operating state detection unit 76 measures the temperature of the housing 6, thereby detecting an operating state of the turbocharger 1A. The operating state detection unit 76 includes a sensor 76s for measuring the temperature of the housing 6. The sensor 76s is installed, for instance, in the housing 6, and particularly, adjacent to the turbine wheel 2 that reaches a high temperature. The position of the sensor 76s may not be adjacent to the turbine wheel 2 as long as it is a position at which the temperature of the housing 6 can be detected. However, when the sensor 76s is installed adjacent to the turbine wheel 2, it is advantageous in that the thermal condition at a position of the housing subjected to high temperature can be directly monitored.

The controller 78 may control the pump P on the basis of parameters other than the temperature of the housing 6 as parameters of the operating state of the turbocharger 1A depending on the operating state of the turbocharger 1A. For example, the controller 78 may control the number of revolutions of the pump P depending on an elapsed time after the turbocharger 1A is started or the number of revolutions of the engine 90. The elapsed time after the turbocharger 1A is started may be obtained from an elapsed time after the engine 90 of the vehicle or the like is started.

In this way, when the number of revolutions of the pump P is controlled on the basis of the elapsed time after the engine 90 is started or the number of revolutions of the engine 90, the operating state detection unit 76 can use a control computer of the engine 90, a sensor for the number of revolutions of the engine 90, and a sensor 76t such as an opening degree sensor of an accelerator in order to detect the operating state of the turbocharger 1A as shown in FIG. 1. The number of revolutions of the pump P can be obtained using a table of a pre-stored operating state and the number of revolutions of the pump P, a map, and a mathematical formula.

For example, when the engine 90 is stopped for a long time, the lubricant by which the oil film damper D is formed may flow down from the gap S between the housing part 61 and the outer race 51. Therefore, the controller 78 increases the discharge quantity caused by the pump P such that the lubricant is sufficiently supplied to the oil film damper D, for instance, when the housing 6 is at a low temperature just after the engine 90 is started, and when the elapsed time after the turbocharger 1A is started is within a predetermined fixed time.

Thereby, the lubricant can be sufficiently supplied to the oil film damper D just after the engine 90 is started.

Further, when the number of revolutions of the engine is high and when the housing 6 is at a high temperature, the controller 78 may increase the discharge quantity caused by the pump P such that the lubricant is sufficiently supplied to the rolling elements 52 of the rolling bearing 5 and the oil ring 41 for the purpose of cooling.

Next, a control method for the turbocharger 1A in the engine system 100A as described above will be described.

Figure 3:
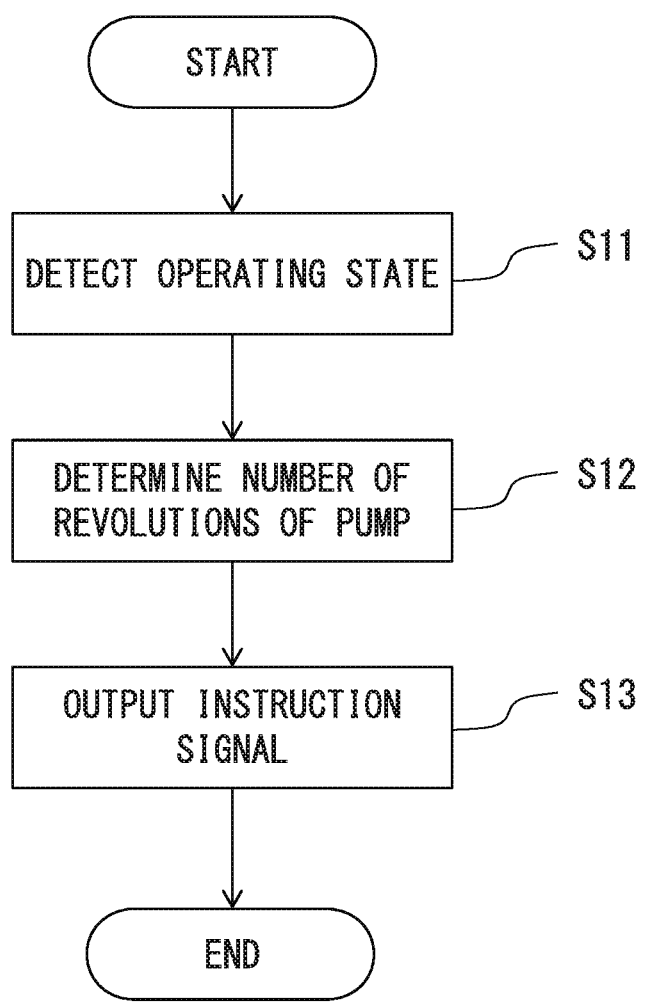
FIG. 3 is a view showing processes of a control method for the turbocharger in the first embodiment of the invention.

FIG. 3 is a view showing a flow of a control method for the turbocharger in the first embodiment of the invention.

(Process S11 of Detecting an Operating State)

As shown in FIG. 3, to control the turbocharger 1A, the operating state of the turbocharger 1A is detected first (process S11).

Here, the operating state detection unit 76 measures the temperature of the housing 6 using the sensor 76s. The operating state detection unit 76 outputs the temperature of the housing 6 detected by the sensor 76s to the controller 78.

The operating state detection unit 76 can detect the number of revolutions of the engine 90 using the sensor 76t.

In this case, the operating state detection unit 76 outputs the number of revolutions of the engine 90, which is detected by the sensor 76t, to the controller 78.

(Processes S12 and S13 of Regulating the Flow Rate of a Lubricant)

The controller 78 is configured to regulate the flow rate of a lubricant supplied to the housing 6 by changing the number of revolutions of the pump P on the basis of the temperature of the housing 6 or the number of revolutions of the engine 90 which is output from the operating state detection unit 76.

Figure 4:
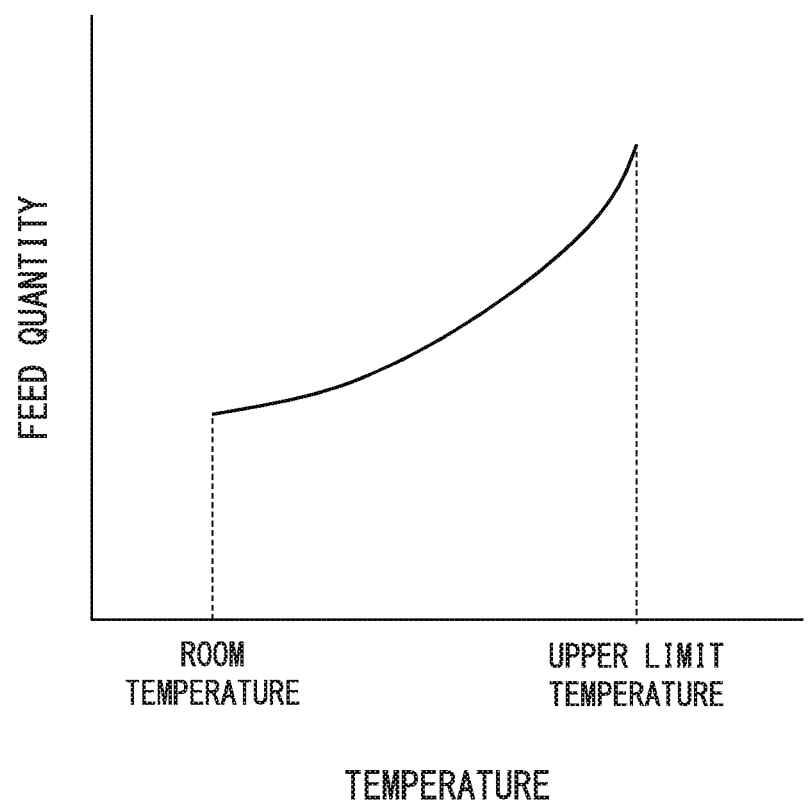
FIG. 4 is a view showing an example of a correlation between the temperature of a housing and the feed quantity to be supplied by a pump.

Here, FIG. 4 is a view showing an example of a correlation between a temperature of a housing and a feed quantity to be supplied by a pump.

As shown in FIG. 4, the higher the temperature of the housing 6 becomes, the more lubricant is required for each unit of the turbocharger 1A. Accordingly, in the controller 78, the temperature of the housing 6 is set by a table, a map, and a mathematical formula in which the temperature of the housing 6 is associated with feed quantities (or feed pressures) supplied by the pump P, that is, the number of revolutions of the pump P, for instance, on the basis of the correlation shown in FIG. 4.

Likewise, if the number of revolutions of the engine 90 rises, the number of revolutions of the turbocharger 1A also rises in conjunction, and the temperature of the housing 6 rises. Therefore, in the controller 78, the number of revolutions of the engine 90 may be set by a table, a map, and a mathematical formula in which the number of revolutions of the engine 90 is associated with the feed quantities (or the feed pressures) supplied by the pump P, that is, the number of revolutions of the pump P, are associated.

The controller 78 determines the number of revolutions of the pump P that is previously associated with the temperature of the housing 6 or the number of revolutions of the engine 90 that is output from the operating state detection unit 76.

The controller 78 outputs an instruction signal to the pump P such that the pump P is rotated according to the determined number of revolutions of the pump P (process S13).

In this way, the flow rate of the lubricant supplied to the housing 6 is automatically regulated on the basis of the operating state such as the temperature of the housing 6 or the number of revolutions of the engine 90.

The series of processes S11 to S13 described above is repetitively performed at intervals of an appropriately set fixed time during the operation of the turbocharger 1A (the engine 90).

According to the aforementioned first embodiment, the flow rate of the lubricant supplied through the supply channels 72 is automatically regulated depending on the temperature of the housing 6. For this reason, during the operation of the turbocharger 1A, proper supply of the lubricant to the rolling elements 52 of the rolling bearing 5, the oil film damper D, and the oil ring 41 can be performed depending on a result of measuring the temperature of the housing 6. Accordingly, the proper supply of the lubricant can be performed depending on the operating state of the turbocharger 1A, and the flow rate of the lubricant can be reduced to reduce loss.

Further, according to the aforementioned first embodiment, the flow rate of the lubricant is increased depending on a rise in the temperature of the housing 6. Thereby, when the number of revolutions of the turbocharger 1A rises so that the temperature of the housing 6 rises, each unit of the turbocharger 1A can be properly lubricated.

Further, according to the aforementioned first embodiment, for example the number of revolutions of the engine 90 is detected to change the flow rate of the lubricant supplied to the turbocharger 1A depending on the operating state of the engine 90, and thereby the proper supply of the lubricant can be performed depending on the operating state.

Here, the example in which the flow rate of the lubricant is automatically regulated depending on the temperature of the housing 6 or the number of revolutions of the engine 90 is given. However, the flow rate of the lubricant may be regulated by comprehensively determining the elapsed time after the aforementioned turbocharger 1A is started or the opening degree of a throttle in addition to the temperature of the housing 6.

The elapsed time after the aforementioned turbocharger 1A is started can be detected by a signal that is acquired from a control computer of the engine 90. However, for example a thermometer such as a thermocouple may be provided in the housing 6 of the turbocharger 1A. In this case, when a temperature in the housing 6 which is detected by the thermometer exceeds a reference temperature (e.g., 100° C.) serving as a threshold that is higher than or equal to a predetermined room temperature, the turbocharger 1A is started, and an elapsed time after that point in time is counted.

Second Embodiment

Next, a second embodiment of the invention will be described. The second embodiment is different from the first embodiment merely in that the flow rate of the lubricant is regulated using an automatic regulating valve for regulating the flow rate of the lubricant. Accordingly, in the description of the second embodiment, the same parts are given the same reference signs, and duplicate description will be omitted. That is, differences from the first embodiment will be mainly described, and a description of constitutions common to the first embodiment will be omitted.

Figure 5:
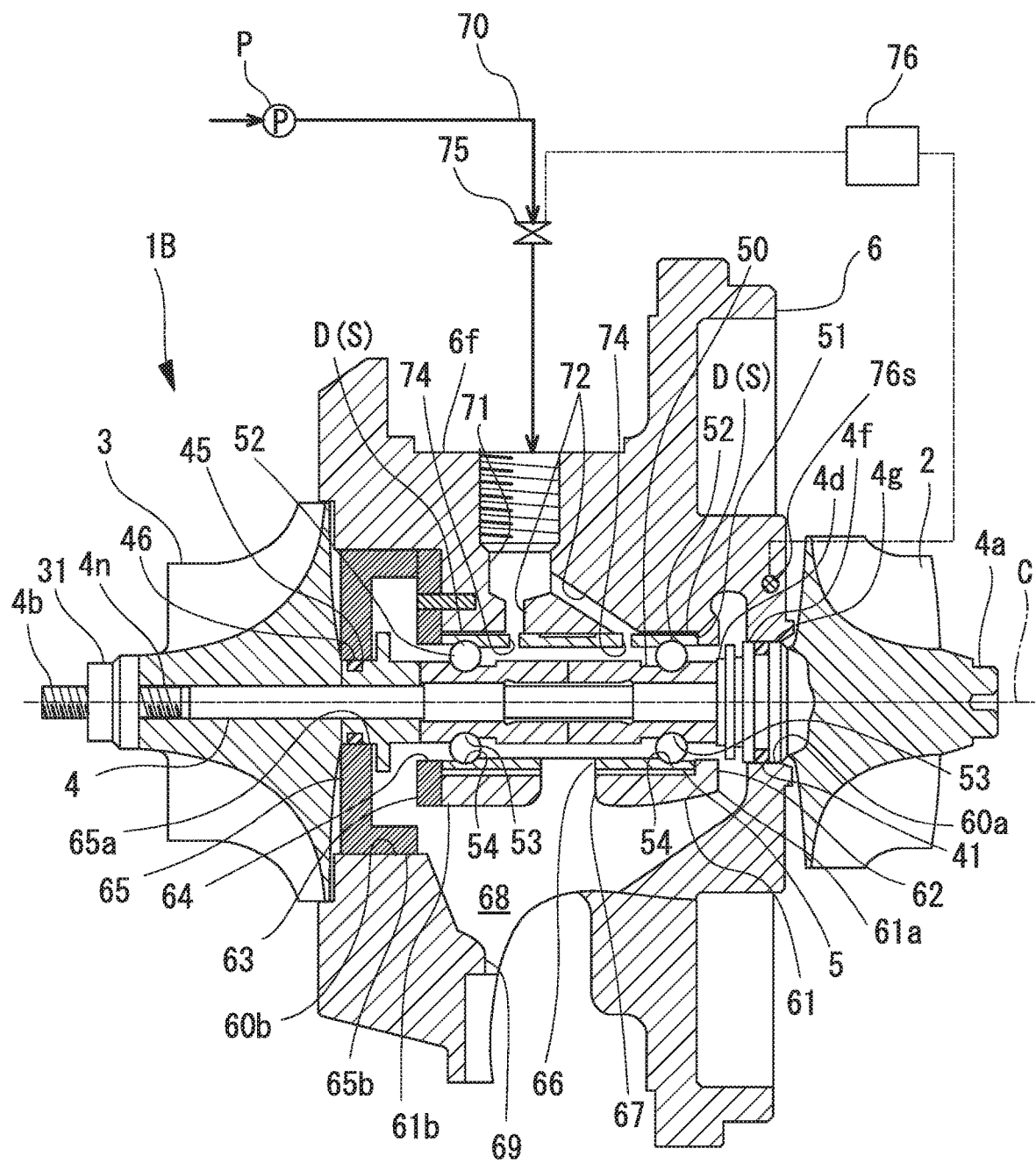
FIG. 5 is a sectional view showing a constitution of a turbocharger in a second embodiment of the invention.

FIG. 5 is a sectional view showing the constitution of a turbocharger in a second embodiment of the invention.

As shown in FIG. 5, in a turbocharger 1B of this embodiment, a lubricant supply pipe 70, which supplies a lubricant fed from the outside by a pump P to a feed pipe connecting port 71, includes an automatic regulating valve (a lubricant regulating unit) 75. The automatic regulating valve 75 is automatically changed to a preset opening degree depending on a temperature of a housing 6 which is measured by an operating state detection unit 76.

The operating state detection unit 76 detects an operating state of the turbocharger 1B by measuring the temperature of the housing 6. In the operating state detection unit 76, a sensor 76s for measuring the temperature of the housing 6 is installed, for instance, adjacent to a turbine wheel 2 that reaches a high temperature in the housing 6.

According to the aforementioned second embodiment, the flow rate of the lubricant supplied through supply channels 72 can be automatically regulated by the automatic regulating valve 75 depending on the temperature of the housing. Accordingly, depending on the operating state of the turbocharger 1B, proper supply of the lubricant to rolling elements 52 of a rolling bearing 5, an oil film damper D, and an oil ring 41 can be performed. As a result, the proper supply of the lubricant can be performed depending on the operating state of the turbocharger 1B.

Third Embodiment

Next, a third embodiment of the invention will be described. The third embodiment is different from the first and second embodiments merely in that the flow rate of the lubricant is regulated using a control valve for regulating the flow rate of the lubricant. Accordingly, in the description of the third embodiment, the same parts are given the same reference signs, and duplicate description will be omitted. That is, differences from the first and second embodiments will be mainly described, and description of constitutions common to the constitutions described in the first and second embodiments will be omitted.

Figure 6:
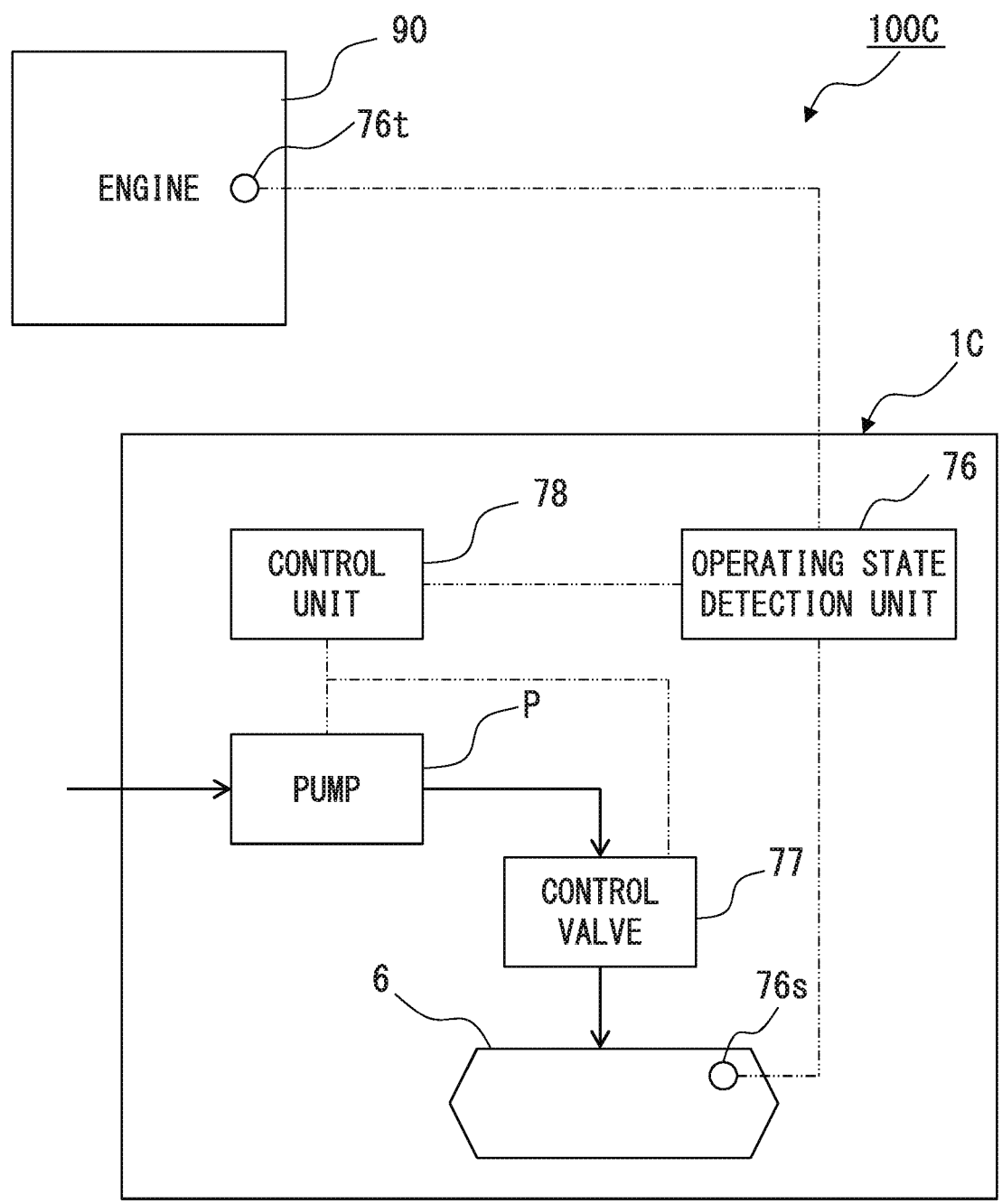
FIG. 6 is a diagram showing a schematic constitution of an engine system in a third embodiment of the invention.
Figure 7:
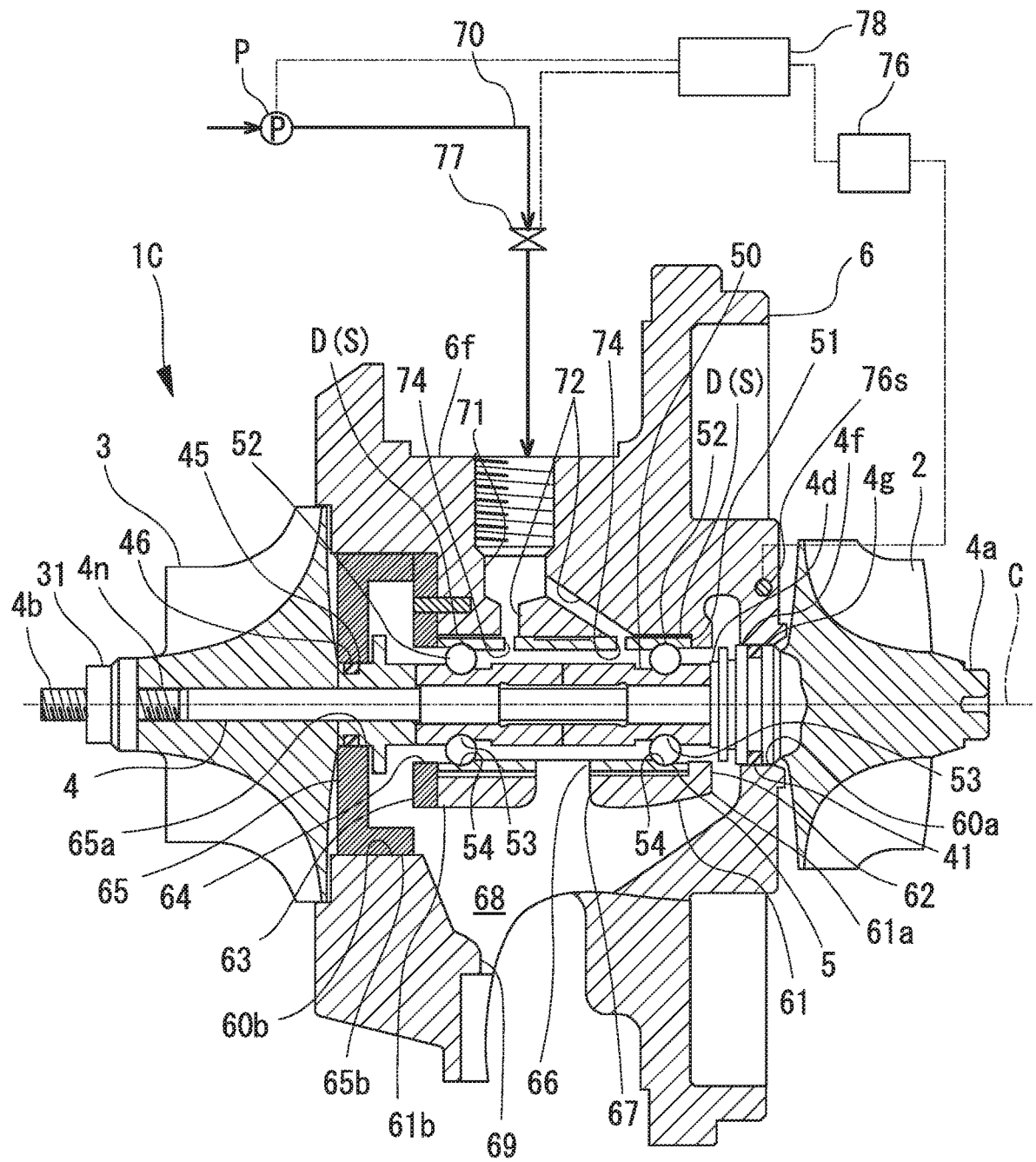
FIG. 7 is a sectional view showing a constitution of a turbocharger in a third embodiment of the invention.

FIG. 6 is a diagram showing a schematic constitution of an engine system in this embodiment of the present invention. FIG. 7 is a sectional view showing a constitution of a turbocharger in the third embodiment of the invention.

As shown in FIG. 6, an engine system 100C includes a turbocharger 1C, and an engine 90 supercharged by the turbocharger 1C.

As shown in FIG. 7, the turbocharger 1C in the third embodiment includes a control valve 77, which can regulate an opening degree by means of a controller 78, on a lubricant supply pipe 70.

The turbocharger 1C may perform regulation of the flow rate caused by the control valve 77 and regulation of a discharge quantity of a pump P by means of the controller 78 at the same time.

The controller 78 is configured to regulate the regulation of the flow rate caused by the control valve 77 depending on, for instance, a temperature of a housing 6, the number of revolutions of the engine 90, or the like that is measured by sensors 76s and 76t of an operating state detection unit 76.

Next, a control method for the turbocharger 1C in the engine system 100C described above will be described.

Figure 8:
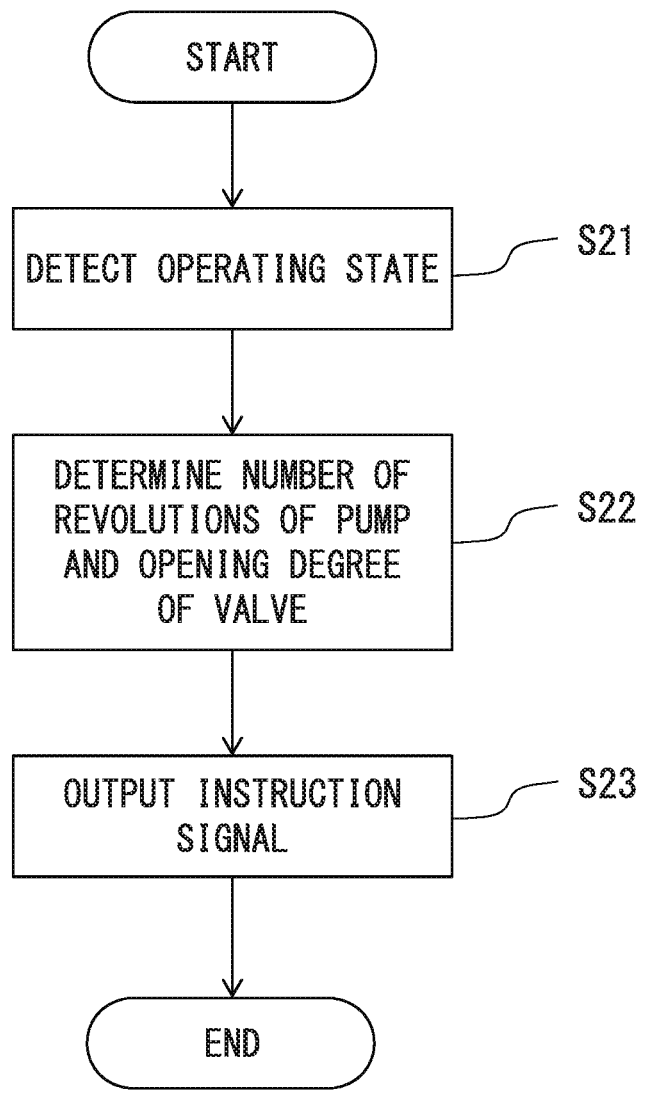
FIG. 8 is a view showing a flow of a control method for the turbocharger in the third embodiment of the invention.

FIG. 8 is a view showing a flow of a control method for the turbocharger in the third embodiment of the invention.

(Process S21 of Detecting an Operating State)

As shown in FIG. 8, to control the turbocharger 1C, the operating state of the turbocharger 1C is detected first (process S21).

Here, the operating state detection unit 76 measures the temperature of the housing 6 using the sensor 76s. The operating state detection unit 76 outputs the temperature of the housing 6, which is detected by the sensor 76s, to the controller 78.

The operating state detection unit 76 can also detect the number of revolutions of the engine 90 using the sensor 76t. In this case, the operating state detection unit 76 outputs the number of revolutions of the engine 90, which is detected by the sensor 76t, to the controller 78.

(Processes S22 and S23 of Regulating the Flow Rate of a Lubricant)

The controller 78 is configured to regulate the flow rate of the lubricant supplied to the housing 6 by changing an opening degree of the control valve 77 on the basis of the temperature of the housing 6 or the number of revolutions of the engine 90 which is output from the operating state detection unit 76. The controller 78 can also regulate the flow rate of the lubricant supplied to the housing 6 by changing the number of revolutions of a pump P.

Here, in the controller 78, the opening degree of the control valve 77 or the number of revolutions of the pump P as a feed quantity (or a feed pressure) supplied by the pump P is associated with the temperature of the housing 6 or the number of revolutions of the engine 90, and the temperature of the housing 6 or the number of revolutions of the engine 90 is set by a table, a map, and a mathematical formula.

The controller 78 determines the opening degree of the control valve 77 and the number of revolutions of the pump P that are previously associated with the temperature of the housing 6 or the number of revolutions of the engine 90 which is output from the operating state detection unit 76.

The controller 78 outputs instruction signals to the control valve 77 and the pump P to adjust the opening degree of the control valve 77 and the number of revolutions of the pump P as determined (process S22).

In this way, the flow rate of the lubricant supplied to the housing 6 is automatically regulated on the basis of the operating state such as the temperature of the housing 6 or the number of revolutions of the engine 90.

In this way, the feed quantity is regulated by regulating the opening degree of the control valve 77, and thereby a response can be improved compared to the regulation of the flow rate of the lubricant caused by the pump P.

In this case, when the opening degree of the control valve 77 and the number of revolutions of the pump P are determined to reduce the flow rate of the lubricant, for instance, in processes S22 and S23, the flow rate is reduced by the control valve 77 and the pump P at the same time. Thereby, an effect of improving a response using the control valve 77 can be obtained, and the discharge quantity of the pump P can be reduced to obtain a loss reducing effect. Further, for example, when the control valve 77 is broken, the flow rate of the lubricant can be regulated only by the pump P.

Fourth Embodiment

Next, a fourth embodiment of the invention will be described. A turbocharger of the fourth embodiment is different from the turbochargers of the first to third embodiments merely in that a rolling bearing 5, an oil film damper Dc, and an oil ring 41 each include an individual lubricant supply system. Accordingly, in the description of the fourth embodiment, the same parts are given the same reference signs, and duplicate description will be omitted. That is, differences from the first to third embodiments will be mainly described, and description of constitutions common to the constitutions described in the first to third embodiments will be omitted.

Figure 9:
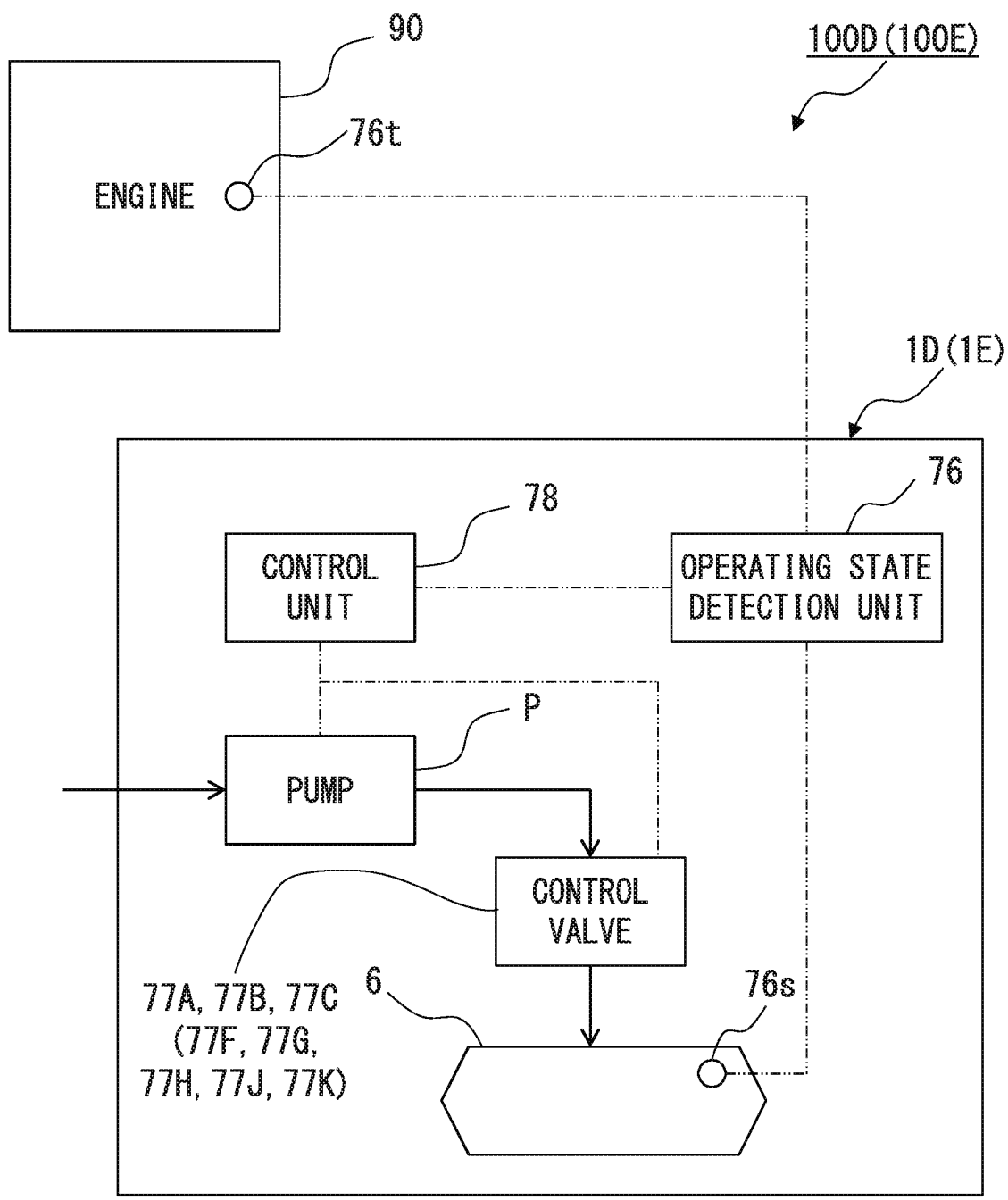
FIG. 9 is a diagram showing a schematic constitution of an engine system in a fourth embodiment of the invention.
Figure 10:
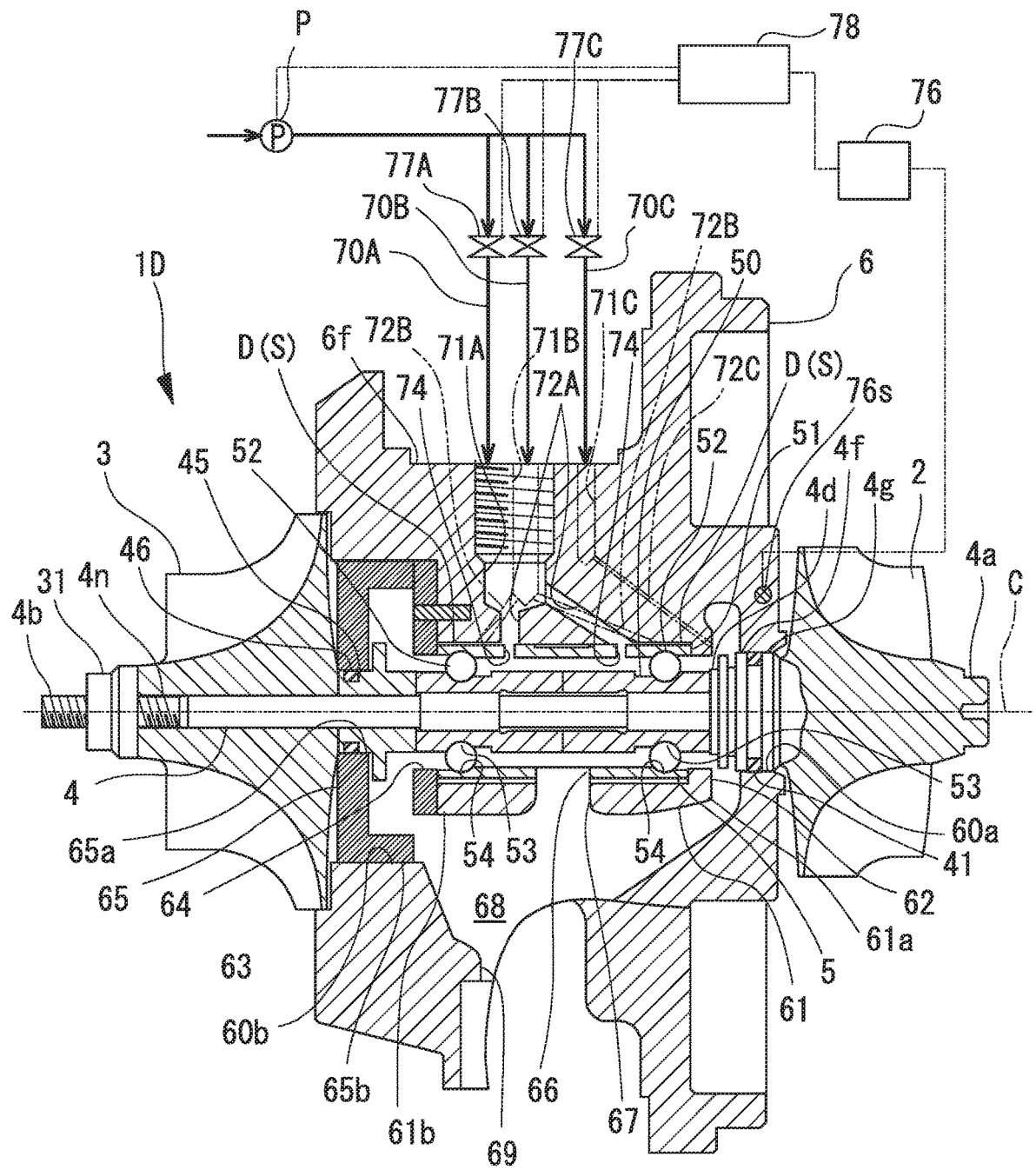
FIG. 10 is a sectional view showing a constitution of a turbocharger in a fourth embodiment of the invention.

FIG. 9 is a diagram showing a schematic constitution of an engine system in the fourth embodiment of the invention. FIG. 10 is a sectional view showing a constitution of the turbocharger in the fourth embodiment of the invention.

As shown in FIG. 9, an engine system 100D includes a turbocharger 1D and an engine 90 supercharged by the turbocharger 1D.

As shown in FIG. 10, a housing 6 of the turbocharger 1D includes feed pipe connecting ports 71A, 71B and 71C. These feed pipe connecting ports 71A, 71B and 71C extend inward from an outer circumferential surface 6f of the housing 6 in a radial direction of the housing 6. The feed pipe connecting ports 71B and 71C are formed at positions that are different from a position of the feed pipe connecting port 71A in circumferential and axial directions of the housing 6.

A plurality of supply channels 72A are formed between a tip portion of the feed pipe connecting port 71A and the housing part 61. The supply channels 72A are open just inside rolling elements 52 provided on opposite ends of the rolling bearing 5 in an axial direction in which the central axis C extends.

A plurality of supply channels 72B are formed between a tip portion of the feed pipe connecting port 71B and the housing part 61. The supply channels 72B are open to a gap S between the housing part 61 and an outer race 51.

A supply channel 72C is formed between a tip portion of the feed pipe connecting port 71C and a large diameter portion 4d of a rotating shaft 4.

A lubricant supply pipe 70A is connected to the feed pipe connecting port 71A. A lubricant supply pipe 70B is connected to the feed pipe connecting port 71B. A lubricant supply pipe 70C is connected to the feed pipe connecting port 71C. These lubricant supply pipes 70A, 70B and 70C individually supply a lubricant, which is fed from the outside by a pump P, to the feed pipe connecting ports 71A, 71B and 71C, respectively.

The lubricant supply pipes 70A, 70B and 70C include control valves (lubricant regulating units) 77A, 77B and 77C. Opening degrees of the control valves 77A, 77B and 77C can be regulated by control of the controller 78.

The controller 78 is configured to regulate the flow rate using the control valves 77A, 77B and 77C depending on, for instance, a temperature of the housing 6, the number of revolutions of the engine 90, and so on, that are measured by sensors 76s and 76t of an operating state detection unit 76.

Next, a control method for the turbocharger 1D in the engine system 100D described above will be described.

Figure 11:
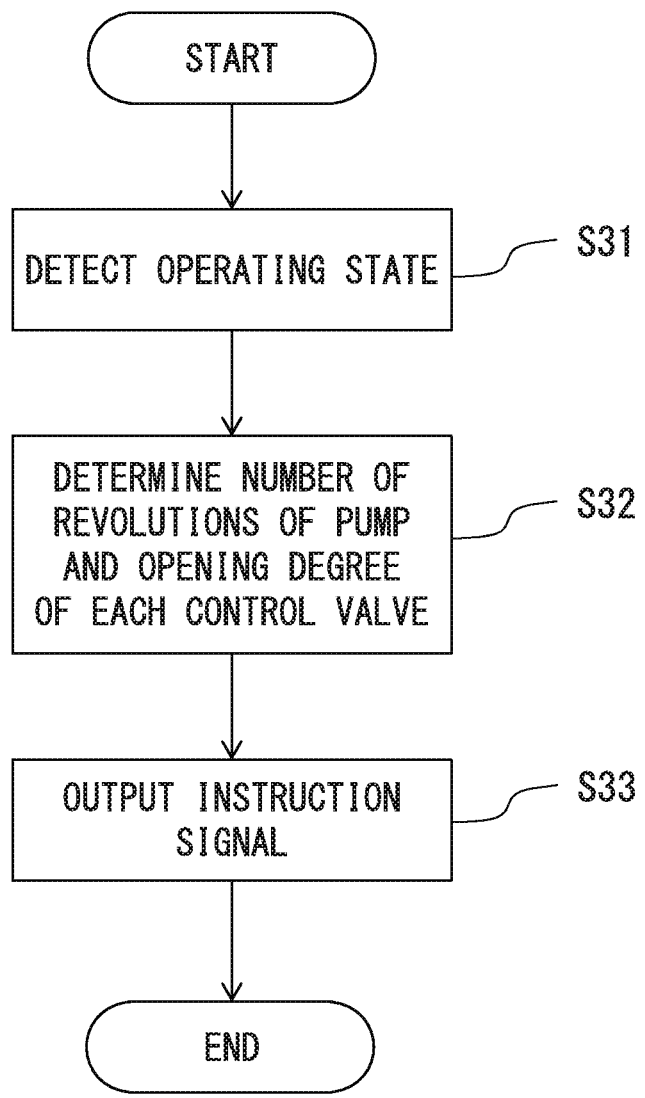
FIG. 11 is a view showing a flow of a control method for the turbocharger in the second embodiment of the invention.

FIG. 11 is a view showing a flow of a control method for the turbocharger in the fourth embodiment of the invention.

(Process S31 of Detecting an Operating State)

As shown in FIG. 11, to control the turbocharger 1D, an operating state of the turbocharger 1D is detected first (process S31).

Here, the operating state detection unit 76 detects the temperature of the housing 6 and the number of revolutions of the engine 90 by means of the sensors 76s and 76t. The operating state detection unit 76 outputs the temperature of the housing 6 and the number of revolutions of the engine 90, which are detected by the sensors 76s and 76t, to the controller 78.

(Processes S32 and S33 of Regulating the Flow Rate of a Lubricant)

The controller 78 is configured to regulate the flow rate of the lubricant supplied to the housing 6 by changing the opening degrees of the control valves 77A, 77B and 77C on the basis of the temperature of the housing 6 or the number of revolutions of the engine 90 that is output from the operating state detection unit 76. The controller 78 can also regulate the flow rate of the lubricant supplied to the housing 6 by changing the number of revolutions of a pump P.

Figure 12:
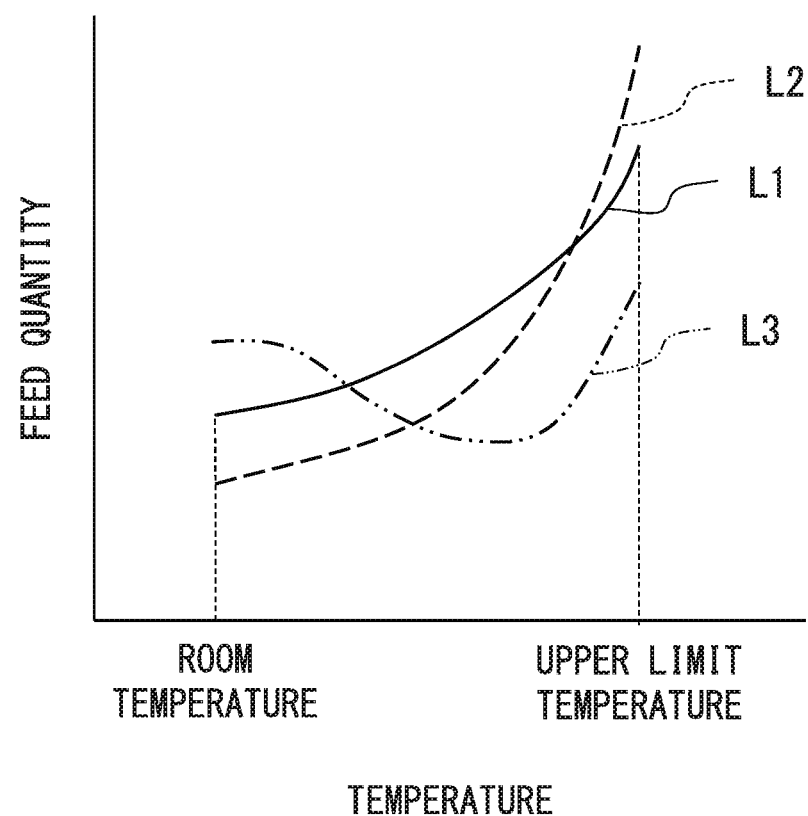
FIG. 12 is a view showing an example of a correlation between a temperature of a housing and a feed quantity to be supplied to each of a rolling bearing, an oil film damper, and an oil ring.

Here, FIG. 12 is a view showing an example of a correlation between a temperature of the housing and a feed quantity to be supplied to each of the rolling bearing 5, the oil film damper Dc, and the oil ring 41.

As shown in FIG. 12, the feed quantities to be supplied with respect to the temperature of the housing 6 differ in the rolling bearing 5, the oil film damper Dc, and the oil ring 41.

For example, as shown in FIG. 12 by a solid line L1, as the temperature of the housing 6 becomes higher, more lubricant is required for the rolling bearing 5.

As shown in FIG. 12 by a broken line L2, when the temperature of the housing 6 is low (or when the number of revolutions of the turbocharger 1D is low), a necessary amount of the lubricant is low, whereas, when the temperature of the housing becomes high, the oil ring 41 requires more of the lubricant than the rolling bearing 5.

As shown in FIG. 12 by a two-dot chain line L3, when the temperature of the housing 6 is low (or when the number of revolutions of the turbocharger 1D is low) and when the temperature is high, more lubricant is required for the oil film damper Dc to improve a damper effect, whereas less lubricant is required during ordinary rotation. In the controller 78, the opening degrees of the control valves 77A, 77B and 77C are associated with the temperature of the housing 6 on the basis of, for instance, the correlation shown in FIG. 12, and the temperature of the housing 6 is set by a table, a map, and a mathematical formula.

Likewise, if the number of revolutions of the engine 90 rises, the number of revolutions of the turbocharger 1D also rises in conjunction, and the temperature of the housing 6 rises. Therefore, in the controller 78, the feed quantities (or the feed pressures), that is, the opening degrees of the control valves 77A, 77B and 77C are associated with the number of revolutions of the engine 90, and the number of revolutions of the engine 90 is set by a table, a map, and a mathematical formula.

The controller 78 determines the opening degrees of the control valves 77A, 77B and 77C and the number of revolutions of the pump P that are previously associated with the temperature of the housing 6 or the number of revolutions of the engine 90 which is output from the operating state detection unit 76 (process S32).

The controller 78 outputs instruction signals to the control valves 77A, 77B and 77C and the pump P to adjust the opening degrees of the control valves 77A, 77B and 77C and the number of revolutions of the pump P as determined (process S33).

In this way, the flow rate of the lubricant supplied to the housing 6 is automatically regulated on the basis of the operating state such as the temperature of the housing 6 or the number of revolutions of the engine 90.

In this way, the lubricant can be individually supplied to the rolling elements 52 of the rolling bearing 5, the oil film damper Dc, and the oil ring 41 by regulating the opening degrees of the control valves 77A, 77B and 77C. In the controller 78, the opening degree of the control valve 77B can be increased such that the lubricant is sufficiently supplied to the oil film damper Dc, for instance, when the housing 6 is at a low temperature just after the engine is started, and when the elapsed time after the engine is started is within a predetermined fixed time. Further, in the controller 78, when the number of revolutions of the engine is high and when the housing 6 is at a high temperature, the opening degrees of the control valves 77A and 77C can be increased such that such that the lubricant is sufficiently supplied to the rolling elements 52 of the rolling bearing 5 and the oil ring 41.

In this way, the lubricant whose amount is suitable for each of the rolling elements 52 of the rolling bearing 5, the oil film damper Dc, and the oil ring 41 can be supplied to them.

Further, the feed quantities are regulated by regulating the opening degrees of the control valves 77A, 77B and 77C, and thereby a response can be improved compared to the regulation of the flow rate of the lubricant caused by the pump P.

According to the fourth embodiment, the lubricant is individually supplied to the rolling elements 52 of the rolling bearing 5, the oil film damper Dc, and the oil ring 41 through the supply channels 72A, 72B and 72C. The flow rate of the lubricant supplied through the supply channels 72A, 72B and 72C is regulated by the control valves 77A, 77B and 77C whose opening degrees are automatically controlled depending on the operating state of the turbocharger 1D. Therefore, depending on the operating state of the turbocharger 1D, the lubricant whose amount is suitable for each of the rolling elements 52 of the rolling bearing 5, the oil film damper Dc, and the oil ring 41 can be supplied to them. For this reason, the rolling bearing 5 can exert a damper effect on the oil film damper Dc and a cooling effect of the oil ring 41 while being sufficiently lubricated to such a degree that stirring resistance is not excessively increased. As a result, proper supply of the lubricant to each unit of the turbocharger 1D can be performed.

(First Modification of the Fourth Embodiment)

As in the fourth embodiment, the opening degrees of the control valves 77A, 77B and 77C are regulated by the controller 78 depending on the operating state of the turbocharger 1D, and thereby a constitution in which the flow rate of the lubricant supplied to each unit is regulated can also be applied to a turbocharger 1E other than the turbocharger 1D shown in the fourth embodiment.

Figure 13:
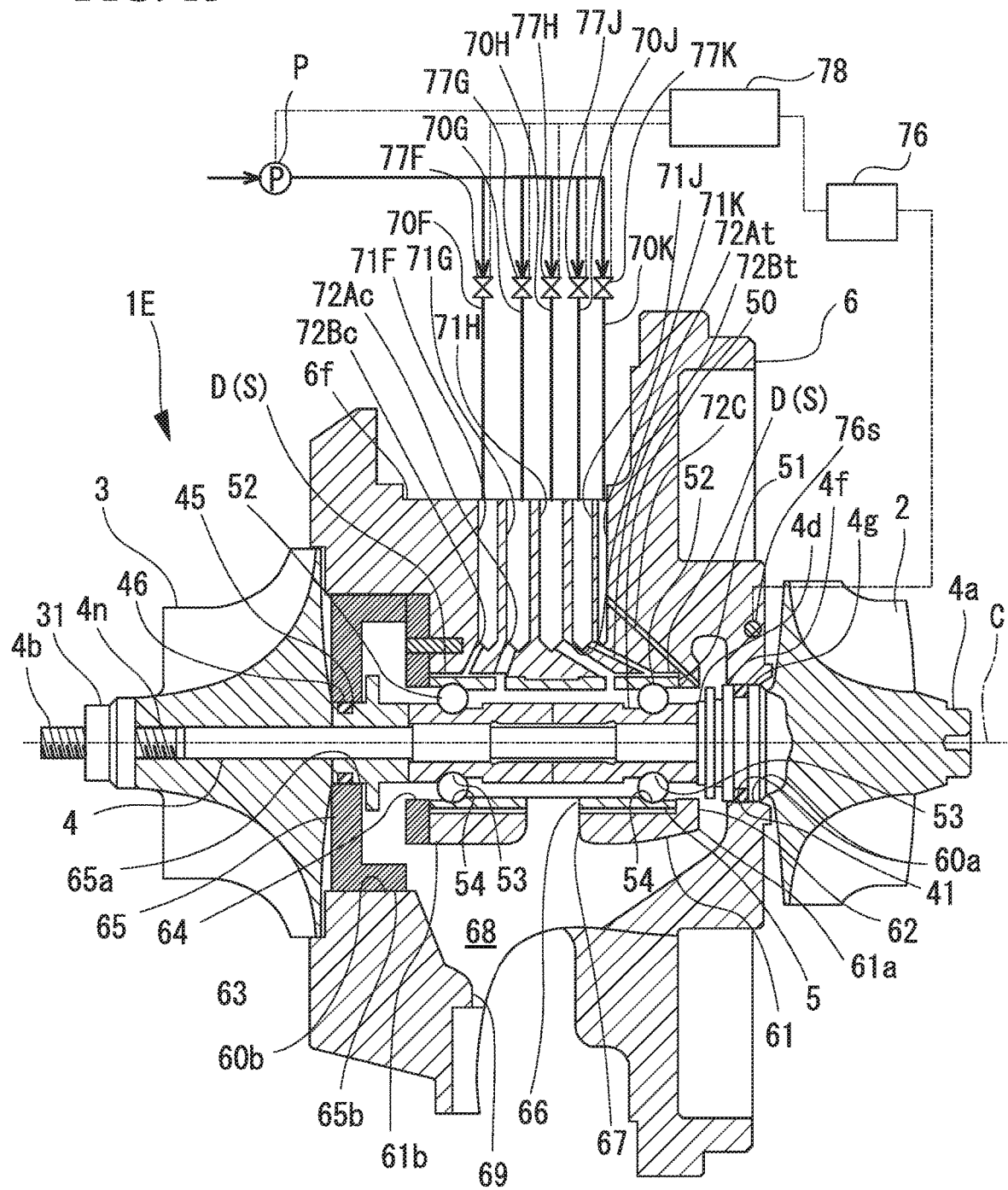
FIG. 13 is a sectional view showing a constitution of a turbocharger in a first modification of the fourth embodiment of the invention.

FIG. 13 is a sectional view showing a constitution of a turbocharger in a first modification of the fourth embodiment of the invention.

In the turbocharger 1E of the engine system 100E (see FIG. 9), as shown in FIG. 13, a housing 6 includes feed pipe connecting ports 71F, 71G, 71H, 71J and 71K. The feed pipe connecting ports 7W, 71G, 71H, 71J and 71K are connected to lubricant supply pipes 70F, 70G, 70H, 70J and 70K to which a lubricant is supplied from the outside of the housing 6. The lubricant supply pipe 70F includes a control valve (a lubricant regulating unit) 77F, and the lubricant supply pipe 70G includes a control valve (a lubricant regulating unit) 77G. The lubricant supply pipe 70H includes a control valve (a lubricant regulating unit) 77H, and the lubricant supply pipe 70J includes a control valve (a lubricant regulating unit) 77J. The lubricant supply pipe 70K includes a control valve (a lubricant regulating unit) 77K.

The housing 6 further includes a supply channel 72Bc, a supply channel 72Ac, a supply channel 72At, a supply channel 72Bt, and a supply channel 72C. These supply channels 72Bc, 72Ac, 72At, 72Bt and 72C differ in inner diameter.

The supply channel 72Bc communicates with the feed pipe connecting port 71F, and supplies the lubricant to an oil film damper Dc close to a compressor wheel 3.

The supply channel 72Ac communicates with the feed pipe connecting port 71G, and supplies the lubricant to rolling elements 52c of a rolling bearing 5 close to the compressor wheel 3.

The supply channel 72At communicates with the feed pipe connecting port 71H, and supplies the lubricant to rolling elements 52t of the rolling bearing 5 close to a turbine wheel 2.

The supply channel 72Bt communicates with the feed pipe connecting port 71J, and supplies the lubricant to an oil film damper Dt close to the turbine wheel 2.

The supply channel 72C communicates with the feed pipe connecting port 71K, and supplies the lubricant to an oil ring 41 close to the turbine wheel 2.

Opening degrees of the control valves 77F, 77G, 77H, 77J and 77K can be individually regulated by control of a controller 78 depending on an operating state such as a temperature of the housing 6 or the number of revolutions of the engine 90 that is measured by sensors 76s and 76t of an operating state detection unit 76.

The controller 78 controls the number of revolutions of a pump P on the basis of the temperature of the housing 6 which is measured by the operating state detection unit 76, and thereby the whole flow rate of the lubricant can be controlled.

The controller 78 controls the opening degrees of the control valves 77F, 77G, 77H, 77J and 77K and the number of revolutions of the pump P using the same flow as the control method for the turbocharger in the fourth embodiment shown in FIG. 11.

Figure 14:
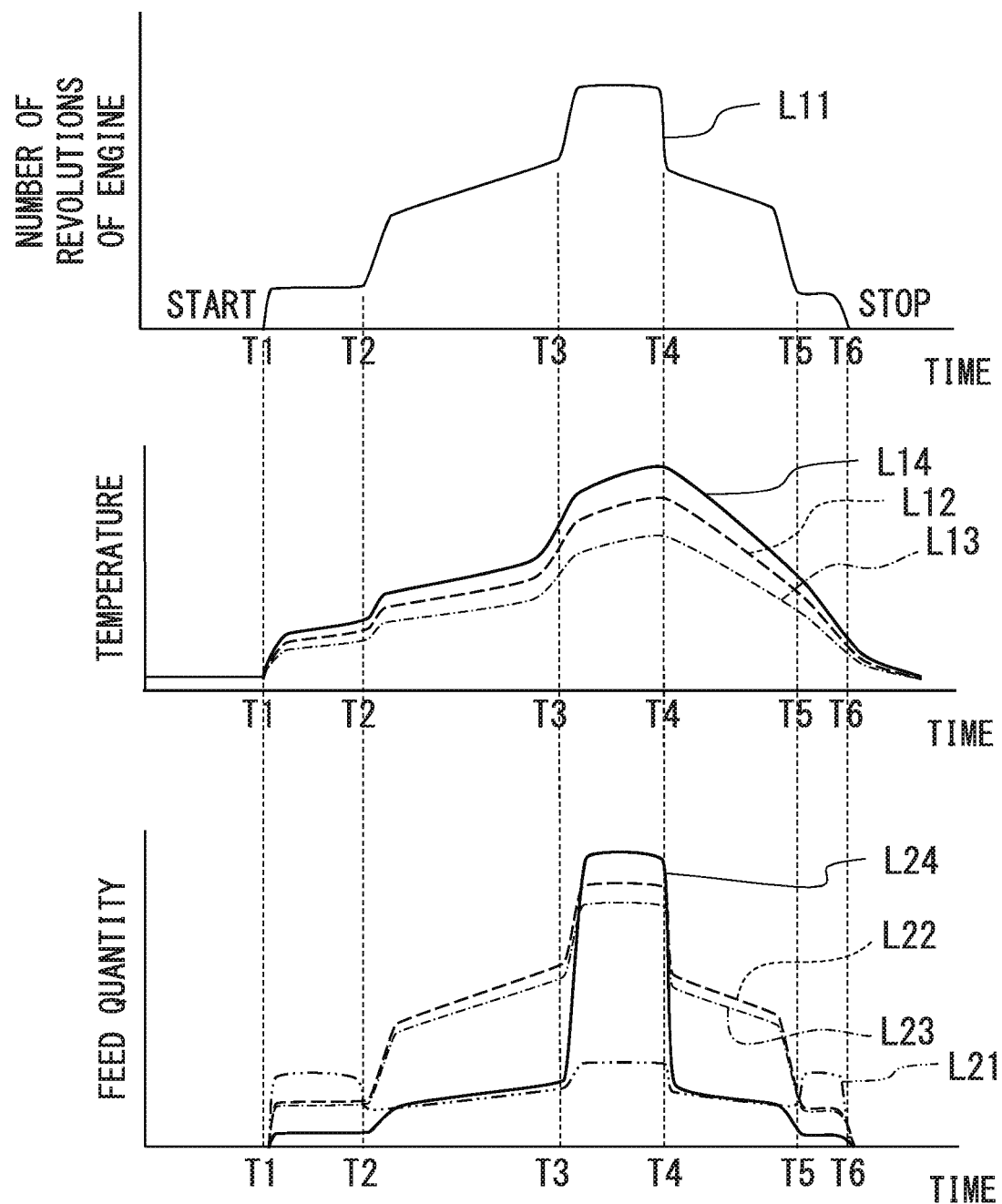
FIG. 14 is a view showing an example of a change in the number of revolutions of an engine, a temperature of each unit, and a supply quantity to each unit with respect to an elapsed time when the turbocharger in the first modification of the fourth embodiment is operated.

FIG. 14 is a view showing an example of a change in the number of revolutions of the engine, a temperature of each unit, and a supply quantity to each unit with respect to an elapsed time when the turbocharger in the first modification of the fourth embodiment is operated.

As shown by a curve L11 that indicates the change in the number of revolutions of the engine and is shown in FIG. 14, the engine 90 is operated. That is, after the engine 90 is started at a time T1, the number of revolutions of the engine is gradually increased from a time T2, and high rotation is maintained from a time T3. Afterwards, the number of revolutions of the engine is gradually reduced from a time T4 to a time T5, and the engine 90 is stopped at a time T6.

In this way, when the engine 90 is operated, the rolling bearing 5 interlocks with the number of revolutions of the engine 90 as shown by temperature change curves L12 and L13, and a temperature thereof is changed. Here, the rolling elements 52t of the rolling bearing 5 which are close to the turbine wheel 2 have a temperature indicated by the temperature change curve L12, and the rolling elements 52c of the rolling bearing 5 which are close to the compressor wheel 3 have a temperature indicated by the temperature change curve L13. The temperature indicated by the temperature change curve L12 is higher than the temperature indicated by the temperature change curve L13.

The temperature of the oil ring 41 which is indicated by a temperature change curve L14 interlocks with the number of revolutions of the engine 90 at a higher temperature than the rolling bearing 5 and the housing 6, and the temperature is changed.

In contrast, when the housing 6 is at a low temperature just after the engine 90 is started, and when an elapsed time from the start of the engine 90 is short, the controller 78 increases the opening degrees of the control valves 77F and 77J. Thereby, the lubricant is sufficiently supplied to the oil film damper D as indicated by, for instance, a feed quantity change curve L21.

Further, for example, when the number of revolutions of the engine is high, and when the housing 6 is at a high temperature, the controller 78 allows the opening degree of the control valve 77H to be larger than that of the control valve 77G. Thereby, as indicated by a feed quantity change curve L22, more lubricant is supplied to the rolling elements 52t of the rolling bearing 5 which are close to the turbine wheel 2 than to the rolling elements 52c indicated by a feed quantity change curve L23.

When the number of revolutions of the engine is high, and when the housing 6 is at a high temperature, the controller 78 can increase the opening degree of the control valve 77K as indicated by a feed quantity change curve L24 such that sufficient lubricant is supplied to the oil ring 41.

In the first modification of the fourth embodiment, like the fourth embodiment, the lubricant whose quantity is suitable for each of the rolling elements 52 of the rolling bearing 5, the oil film damper D, and the oil ring 41 can be more finely regulated and supplied during the operation of the turbocharger 1D depending on the result of measuring the temperature of the housing 6.

(Second Modification of the Fourth Embodiment)

Figure 15:
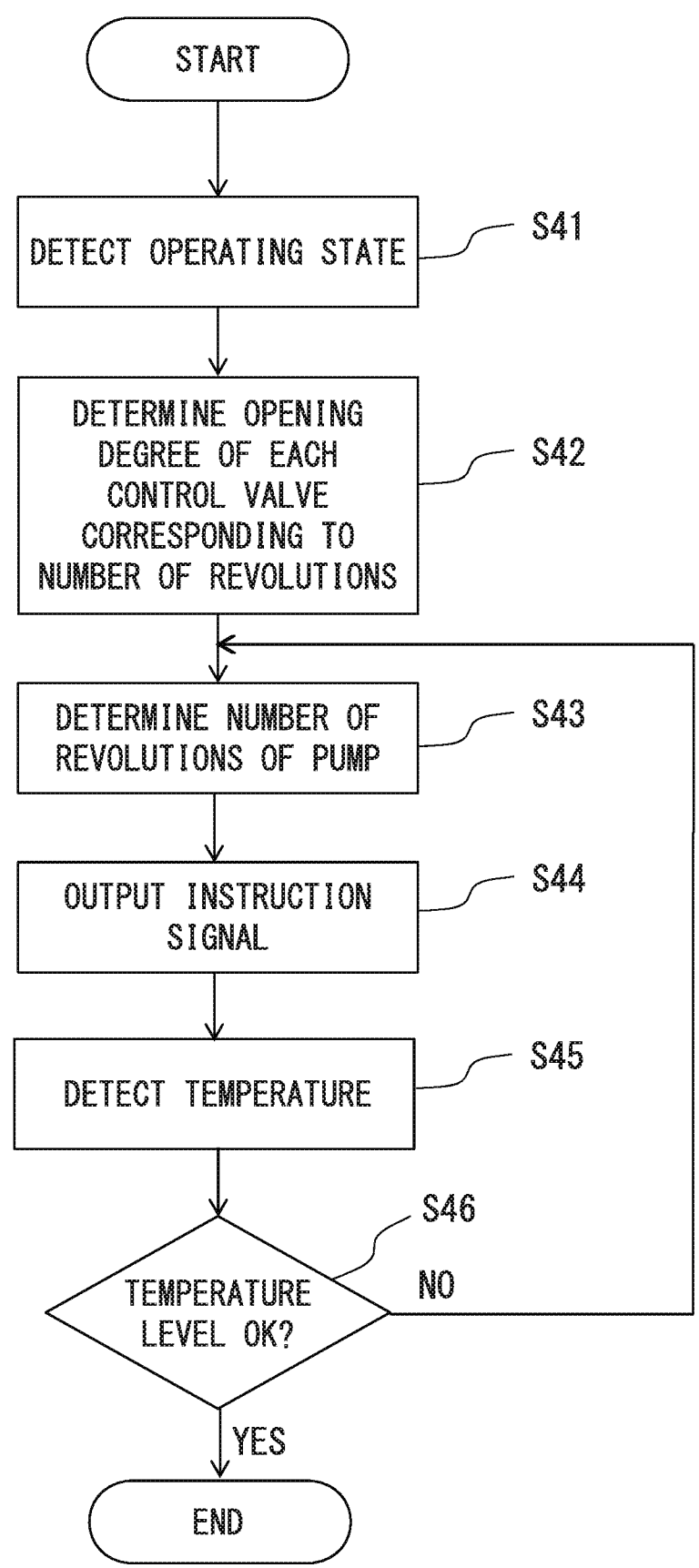
FIG. 15 is a view showing a flow of a control method for a turbocharger in a second modification of the fourth embodiment of the invention.

FIG. 15 is a view showing a flow of a control method for a turbocharger in a second modification of the fourth embodiment of the invention.

As shown in fourth embodiment and the first modification thereof, depending on the operating states of the turbochargers 1D and 1E, the plurality of control valves 77A, 77B, 77C, 77F, 77G, 77H, 77J and 77K are set to differ in opening degree.

Therefore, the number of revolutions of the engine 90 and the opening degrees of the control valves 77A, 77B, 77C, 77F, 77G, 77H, 77J and 77K are associated such that the feed quantity to each unit becomes a preset feed quantity depending on, for instance, the number of revolutions of the engine 90, and the number of revolutions of the engine 90 can also be set for the controller 78 by the table, the map, and the mathematical formula.

As shown in FIG. 15, first, the controller 78 detects the operating states of the turbochargers 1D and 1E from the number of revolutions of the engine 90 which is detected by the sensor 76t of the operating state detection unit 76 (see FIG. 9) (process S41).

Next, the controller 78 determines the opening degrees of the control valves 77A, 77B, 77C, 77F, 77G, 77H, 77J and 77K from information associated with the detected number of revolutions of the engine 90 (process S42).

Further, the controller 78 determines the number of revolutions of the pump P from the detected number of revolutions of the engine 90 (process S43).

Subsequently, the controller 78 outputs the determined opening degrees of the control valves 77A, 77B, 77C, 77F, 77G, 77H, 77J and 77K and the determined number of revolutions of the pump P as instruction signals (process S44).

The control valves 77A, 77B, 77C, 77F, 77G, 77H, 77J and 77K and the pump P supply the lubricant with the opening degree and the number of revolutions that are output from the controller 78.

Afterwards, the temperature of the housing 6 which is detected by the sensor 76s of the operating state detection unit 76 is acquired (process S45).

The controller 78 determines whether or not the detected temperature of the housing 6 is within a preset temperature level (or within a predetermined temperature range) (process S46). Here, the preset temperature level is set to be lower than or equal to an allowable temperature range for components constituting each unit inside the housing 6, for instance, high-temperature components such as the bearing 5, the oil ring 41, and so on.

As a result of the determination in process S46, if the detected temperature of the housing 6 is within the preset temperature level, the controller 78 terminates the process.

If the detected temperature of the housing 6 is not within the preset temperature level, the controller 78 returns to process S43, and changes and redetermines the number of revolutions of the pump P. Afterwards, the controller 78 outputs the redetermined number of revolutions of the pump P as an instruction signal (process S44), and changes the number of revolutions of the pump P to perform an operation. Then, the controller 78 detects the temperature of the housing 6 using the sensor 76s again (process S45), and determines whether or not the detected temperature of the housing 6 is within a predetermined temperature level.

In this way, the controller 78 merely is configured to regulate the number of revolutions of the pump P after setting balance between the opening degrees of the plurality of control valves 77A, 77B, 77C, 77F, 77G, 77H, 77J and 77K in process S42, and allows the temperature of each unit of the turbocharger 1D or 1E to be operated within a proper range.

Other Embodiments

The invention is not limited to the aforementioned embodiments, and can include a change in design without departing from the spirit of the invention.

For example, the operating state of the turbocharger 1A, 1B, 1C, 1D or 1E which serves as a reference for regulating the opening degree of the automatic regulating valve 75 or the control valve 77, 77A, 77B, 77C, 77F, 77G, 77H, 77J or 77K is not limited to the aforementioned example, and may use other information.

The constitution of the rolling bearing 5 is not limited to that shown in the aforementioned embodiments, and another appropriate constitution can be used.

In the aforementioned embodiments, the rolling bearing 5 is configured to have, for instance, only one rolling bearing, but it is not limited thereto. For example, a plurality of rolling bearings may be configured to be arranged in series in the direction of the central axis of the rotating shaft 4.

Further, the constitution of the turbocharger 1A, 1B, 1C, 1D or 1E is not limited to that shown in the aforementioned embodiments, and another appropriate constitution can be used.

In addition, the constitutions shown in the aforementioned embodiments and modifications can be appropriately combined.

INDUSTRIAL APPLICABILITY

Depending on the operating state, the flow rate of the lubricant supplied into the housing is changed, and thereby the proper supply of the lubricant can be performed depending on the operating state of the turbocharger.

REFERENCE SIGNS LIST 1A, 1B, 1C, 1D, 1E Turbocharger
2 Turbine wheel
3 Compressor wheel
4 Rotating shaft
4a First end
4b Second end
4d Large diameter portion
4f, 4g Flange portion
4n Threaded portion
5 Rolling bearing
6 Housing
6b Opening
6f Outer circumferential surface
31 Nut
41 Oil ring
45 Bush
46 Oil ring
50 Inner race
51 Outer race
52, 52c, 52t Rolling element
53, 54 Raceway groove
60a, 60b Opening
61 Housing part
61a End
61b End
62 Thrust receiving portion
63 Thrust receiving member
64 Opening
65 Plate
65a Opening
65b Circumferential wall portion
66, 67 Discharge channel
68 Oil discharge chamber
69 Oil outlet
70, 70A, 70B, 70C, 70F, 70G, 70H, 70J, 70K Lubricant supply pipe (lubricant supply line)

71 Feed pipe connecting port
71A, 71B, 71C, 71F, 71G, 71H, 71J, 71K Feed pipe connecting port
72 Supply channel
72A, 72Ac, 72At, 72B, 72Bc, 72Bt, 72C Supply channel
74 Lubricant introduction hole
75 Automatic regulating valve (lubricant regulating unit)
76 Operating state detection unit
76s Sensor
76t Sensor
77, 77A, 77B, 77C, 77F, 77G, 77H, 77J, 77K Control valve (lubricant regulating unit)
78 Controller (control unit)
90 Engine
100A, 100C, 100D, 100E Engine system
C Central axis (axis)
D, Dc Oil film damper
L1 Solid line
L11 Curve indicating number of revolutions of engine
L12, L13, L14 Temperature change curve
L2 Broken line
L21, L22, L23, L24 Feed quantity change curve
L3 Two-dot chain line
P Pump (lubricant regulating unit)
S Gap

The invention claimed is:

1. A turbocharger comprising:
a rotating shaft configured to extend along an axis;
a turbine wheel installed on to a first end of the rotating shaft;
a compressor wheel installed on a second end of the rotating shaft;
a rolling bearing having an inner race fixed to an outer circumferential surface of the rotating shaft, an outer race disposed to surround the inner race from an outside in a radial direction thereof, and rolling elements arranged between the inner race and the outer race, and configured to support the rotating shaft to be rotatable about the axis;
a housing disposed to cover the rolling bearing from an outer circumferential side via a gap between the housing and an outer circumferential surface of the rolling bearing;
an oil ring configured to maintain a seal between an opening of the housing and the rotating shaft;
a plurality of supply channels configured to individually supply a lubricant to the rolling bearing and the oil ring;
a plurality of lubricant supply lines configured to supply the lubricant to each of the plurality of supply channels in the housing;
an operating state detection unit provided with a sensor that measures a temperature of the housing and configured to detect the measured temperature as an operating state;
a plurality of lubricant regulating units configured to individually regulate the flow rate of the lubricant flowing through each of the plurality of lubricant supply lines according to the operating state; and
a control unit configured to control the plurality of lubricant regulating units on the basis of the operating state detected by the operating state detection unit; wherein
the control unit is configured to increase the flow rate of the lubricant as the temperature of the housing rises, and
wherein the temperature of the housing becomes higher than a predetermined temperature, the control unit is configured to increase a flow rate of the lubricant supplied to the oil ring than a flow rate of the lubricant supplied to the rolling bearing.

2. The turbocharger according to claim 1, wherein:
the lubricant regulating unit includes
a pump configured to supply the lubricant to the lubricant supply line, and
a control valve that is provided on the lubricant supply line; and
when the flow rate of the lubricant is reduced by controlling the lubricant regulating units, the control unit is configured to reduce the flow rate using both of the control valve and the pump.

3. An engine system comprising:
the turbocharger according to claim 1; and
an engine supercharged by the turbocharger,
wherein the operating state detection unit detects the elapsed time after the engine is started or the number of revolutions of the engine as an operating state of the engine, and
the control unit is configured to regulate the flow rate of the lubricant depending on the operating state of the engine.

4. A control method for a turbocharger comprising:
detecting at least a temperature of a housing disposed to cover a rolling bearing as an operating state; and
regulating the flow rate of a lubricant supplied into the housing according to the operating state, wherein
when the temperature of the housing becomes higher than a predetermined temperature, increasing a flow rate of the lubricant supplied to an oil ring configured to maintain a seal between an opening of the housing and a rotating shaft than a flow rate of the lubricant supplied to the rolling bearing.

5. The control method for a turbocharger according to claim 4, further comprising
reducing the flow rate of the lubricant, which is supplied into the housing by a lubricant supply line, using both of a pump configured to supply the lubricant to the lubricant supply line and a control valve that is provided on the lubricant supply line.

* * * * *